(12) United States Patent
Renna

(10) Patent No.: US 10,897,171 B1
(45) Date of Patent: Jan. 19, 2021

(54) ARTIFICIAL MUSCLE FIBERS INCLUDING COOLING AND A METHOD OF MANUFACTURE THEREOF

(71) Applicant: STMicroelectronics S.r.l., Agrate Brianza (IT)

(72) Inventor: Lucio Renna, Acireale (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 10 days.

(21) Appl. No.: 16/517,147

(22) Filed: Jul. 19, 2019

(51) Int. Cl.
| | |
|---|---|
| *H02K 3/24* | (2006.01) |
| *H02K 41/03* | (2006.01) |
| *H02K 11/00* | (2016.01) |
| *B25J 9/12* | (2006.01) |
| *H02K 9/19* | (2006.01) |
| *H02K 11/33* | (2016.01) |
| *H02K 15/06* | (2006.01) |

(52) U.S. Cl.
CPC .......... *H02K 3/24* (2013.01); *B25J 9/12* (2013.01); *H02K 9/19* (2013.01); *H02K 11/33* (2016.01); *H02K 15/065* (2013.01); *H02K 41/03* (2013.01); *H02K 2203/15* (2013.01)

(58) Field of Classification Search
USPC .......................................... 310/12.01–12.33
See application file for complete search history.

(56) References Cited

U.S. PATENT DOCUMENTS

2020/0201148 A1* 6/2020 Lima .................... G03B 17/561

* cited by examiner

*Primary Examiner* — Thomas Truong
(74) *Attorney, Agent, or Firm* — Slater Matsil, LLP

(57) ABSTRACT

An artificial muscle fiber includes an external fiber and an internal fiber. The external fiber includes a first linear array of actuators having protrusions directed in a first direction. The internal fiber includes a second linear array of actuators having protrusions directed in a second direction opposite to the first direction. The internal fiber further includes a channel attached to the second linear array of actuators.

20 Claims, 30 Drawing Sheets

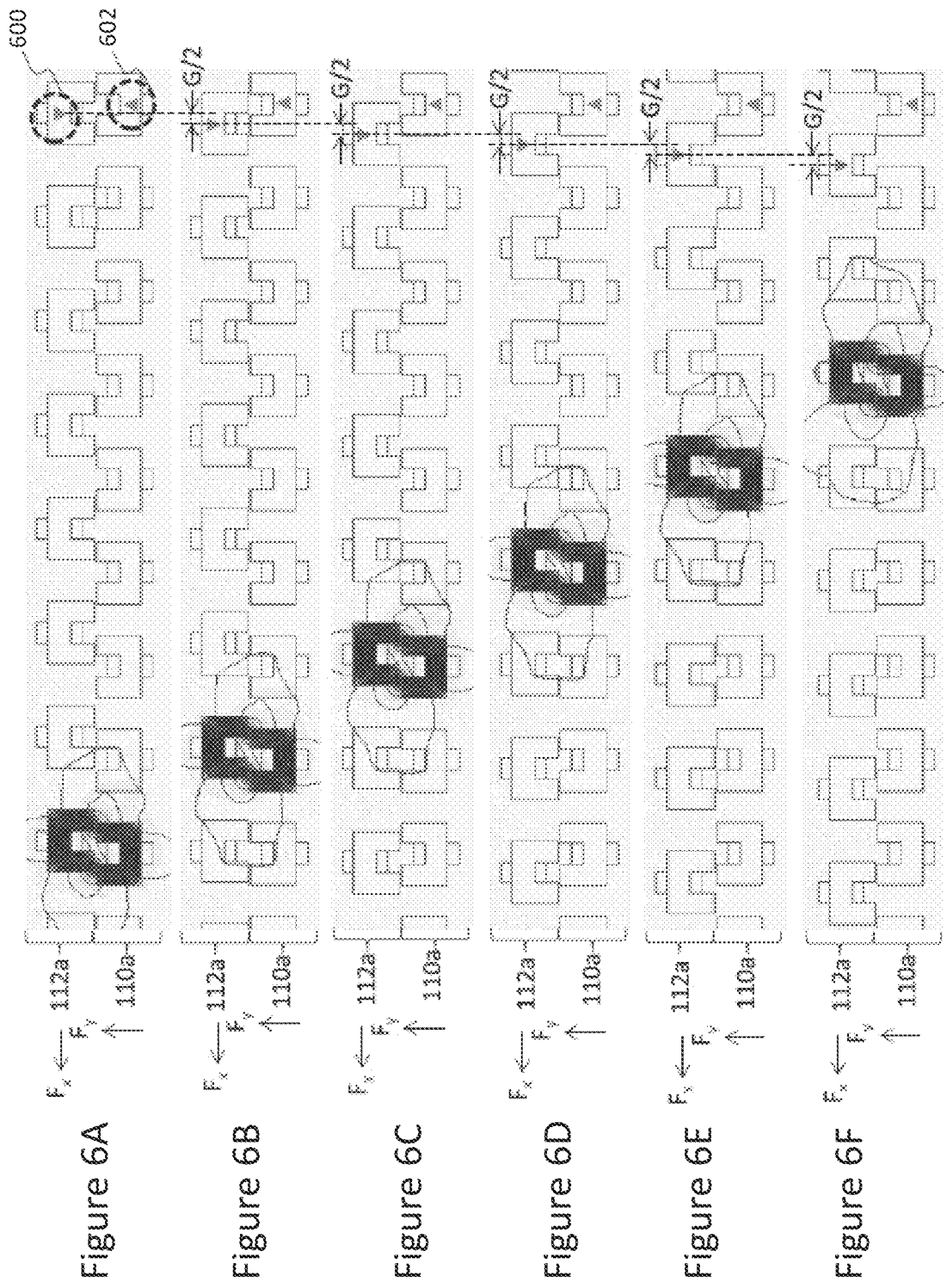

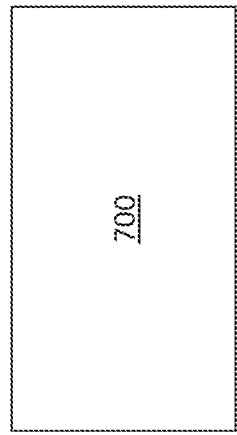
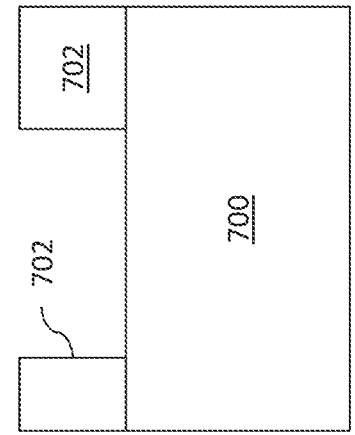
Figure 7A
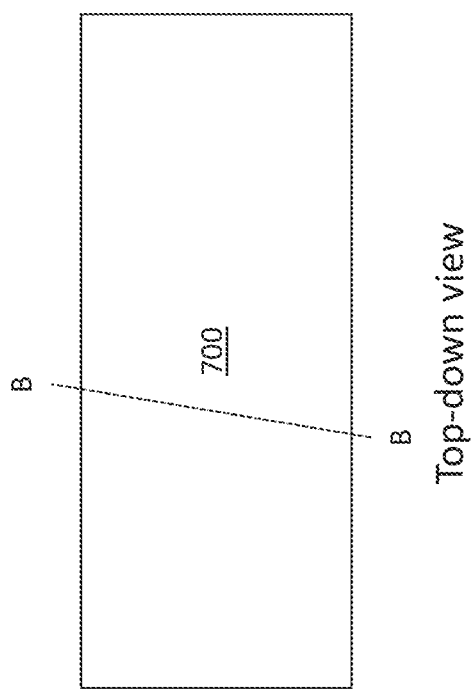
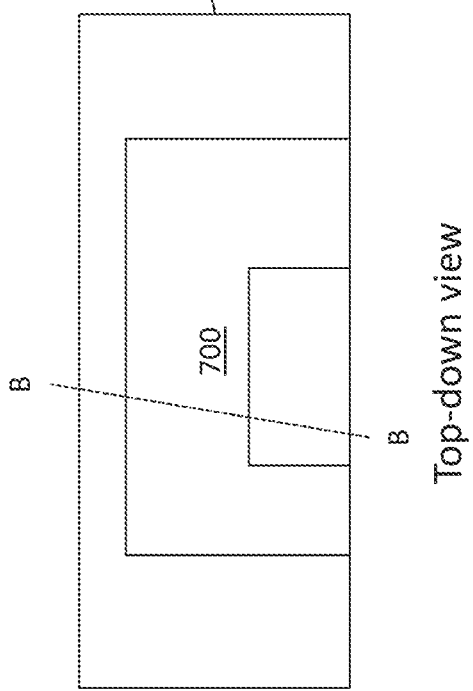
Figure 7B

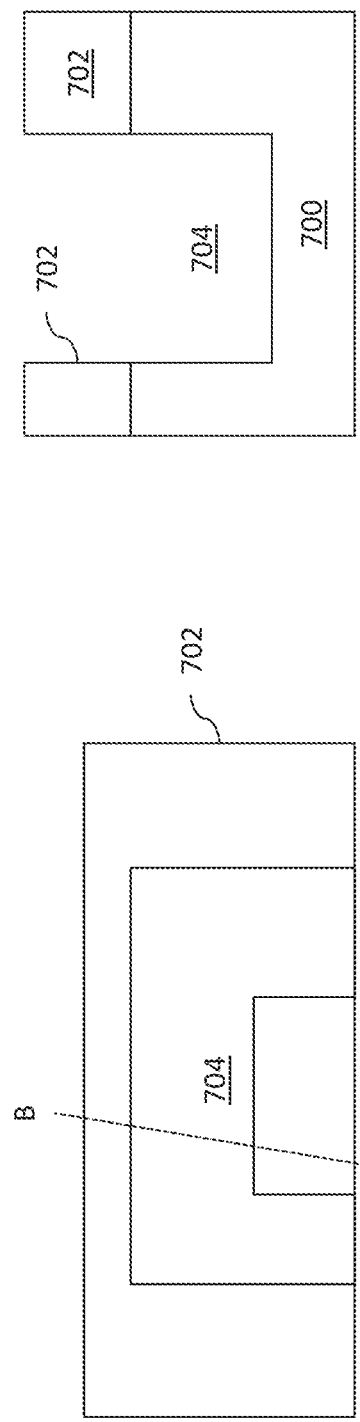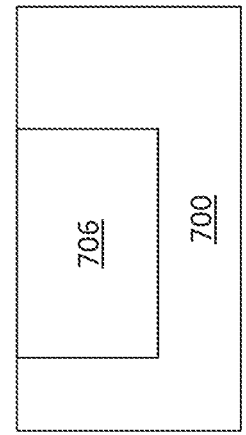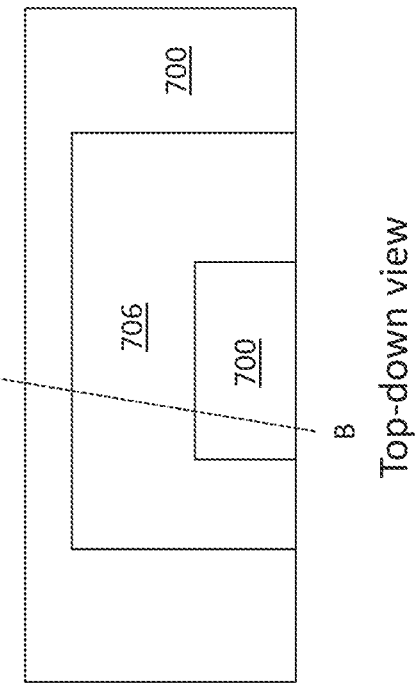
Figure 7C
Figure 7D

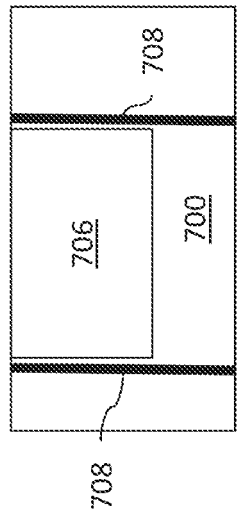
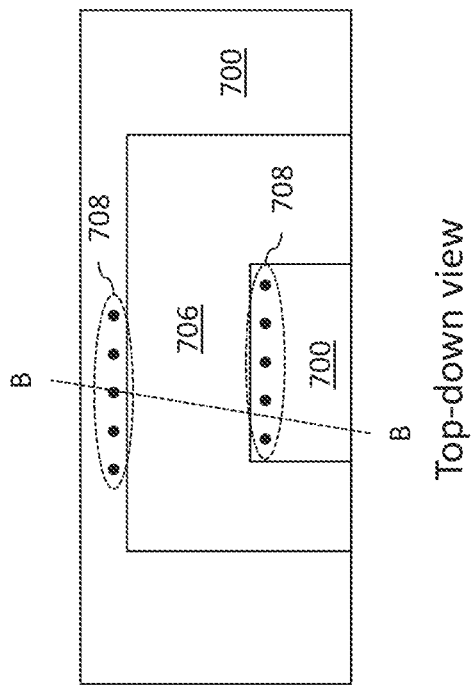
Figure 7E
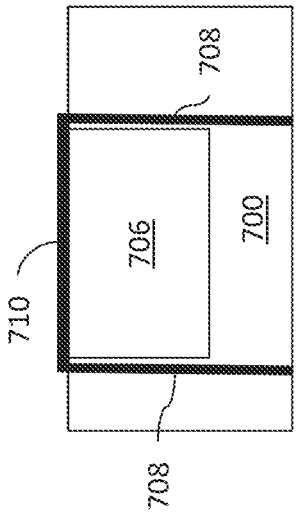
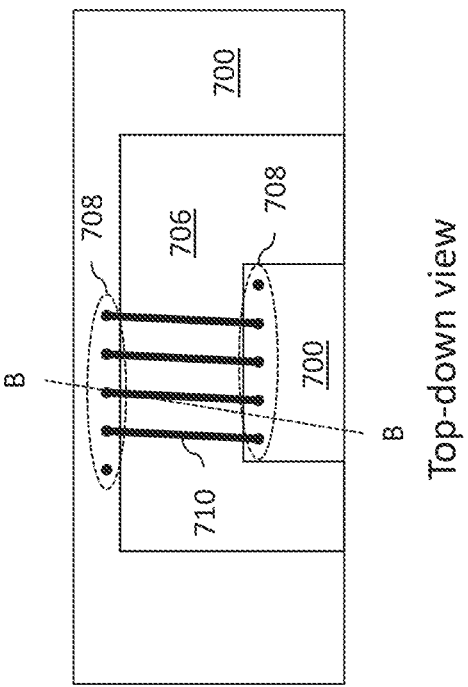
Figure 7F

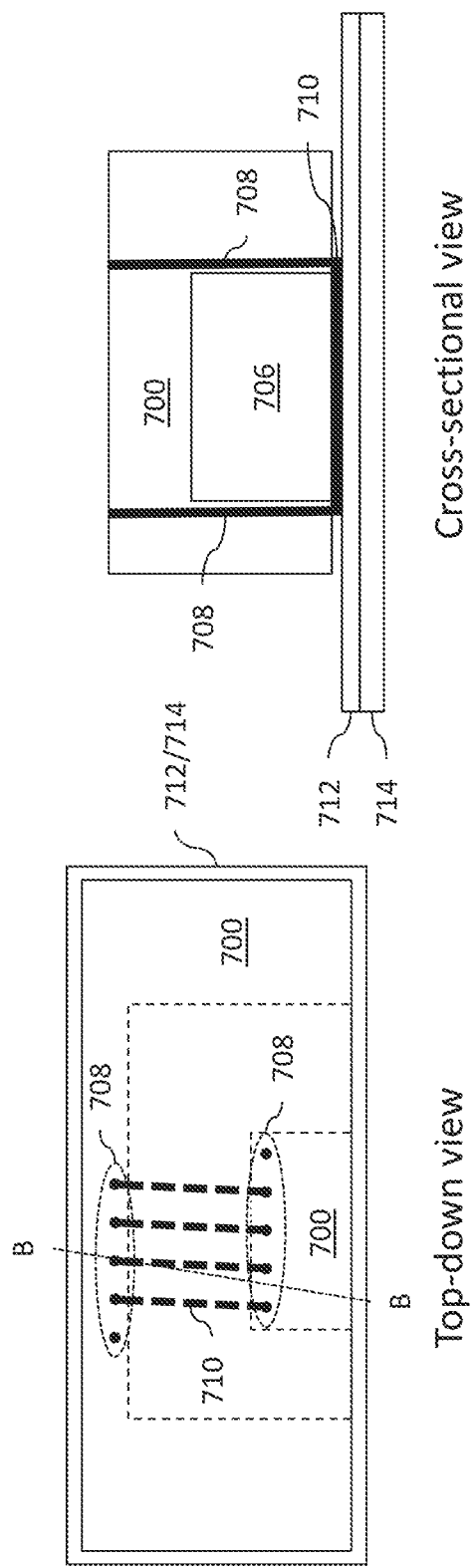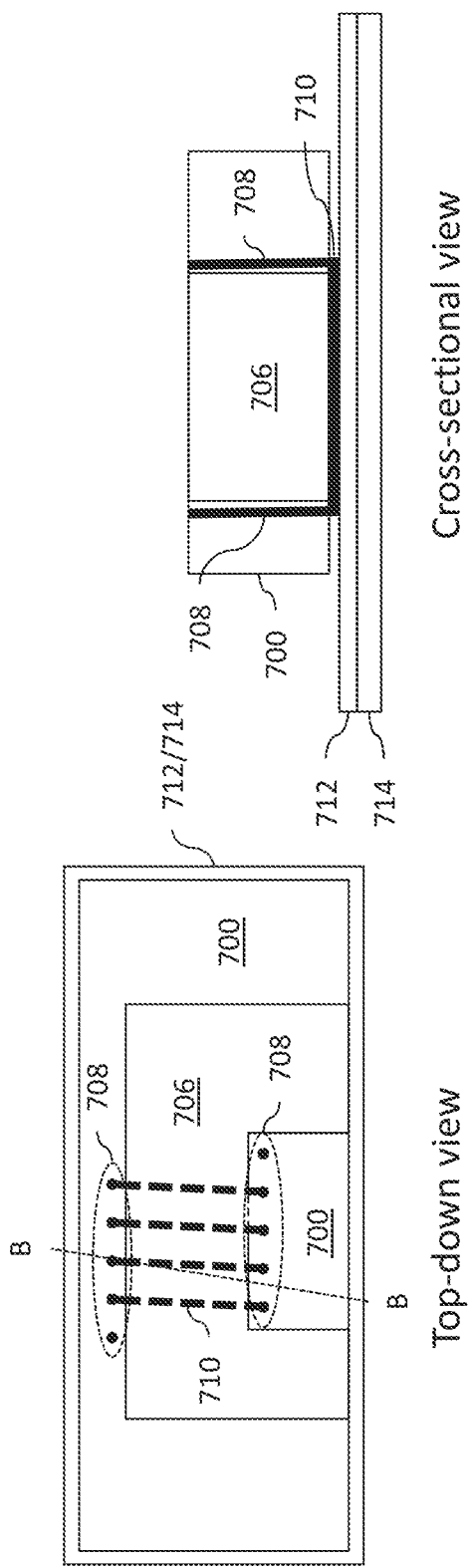
Figure 7G
Figure 7H

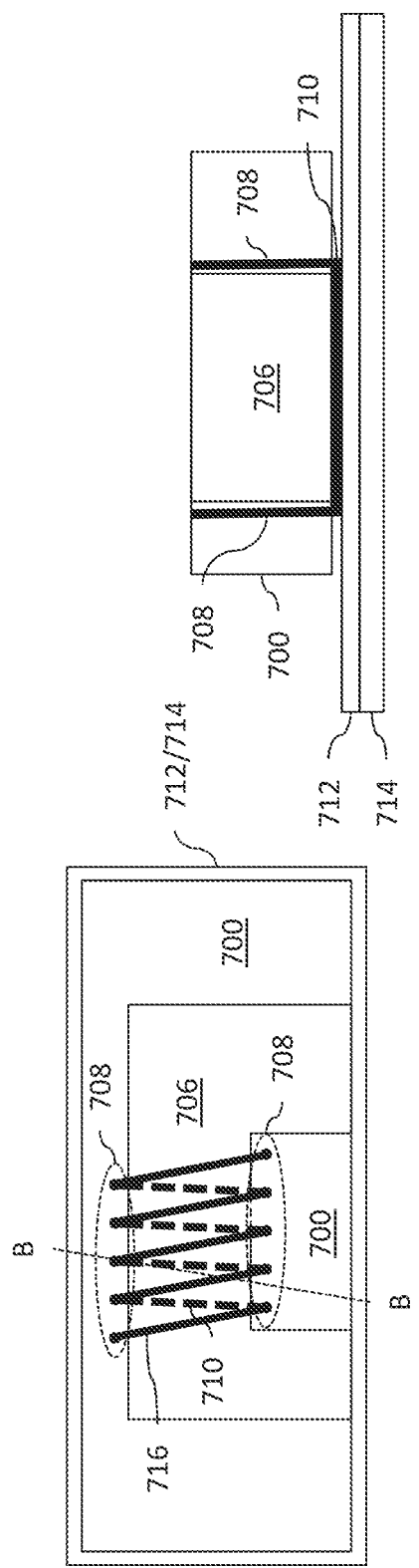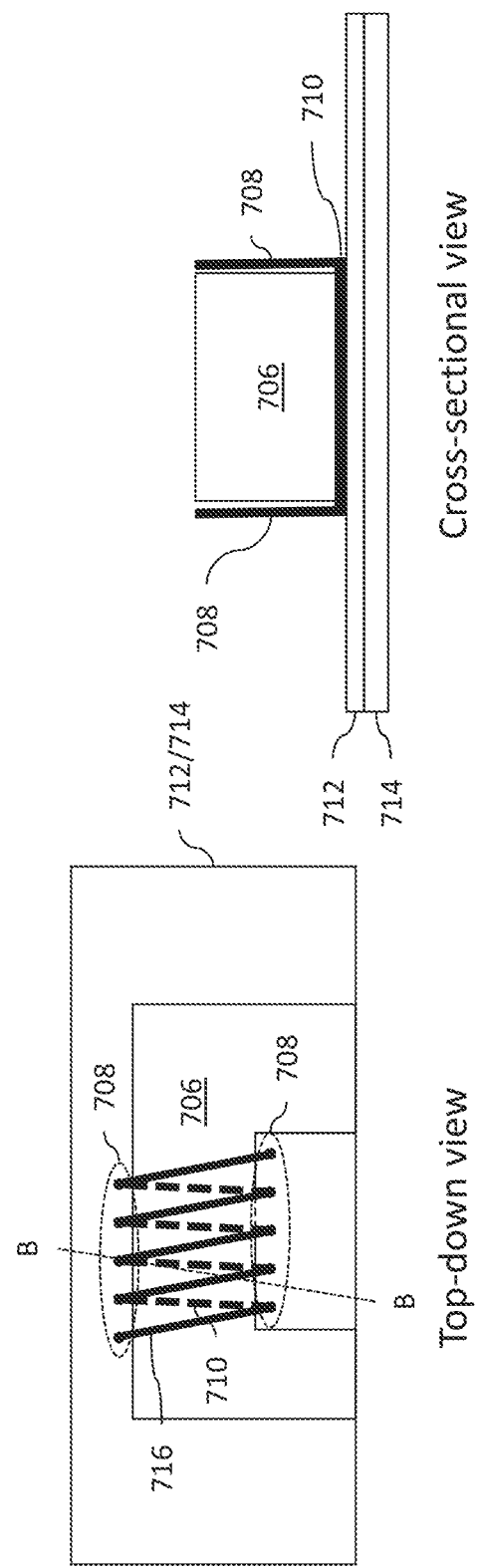
Figure 7I
Figure 7J

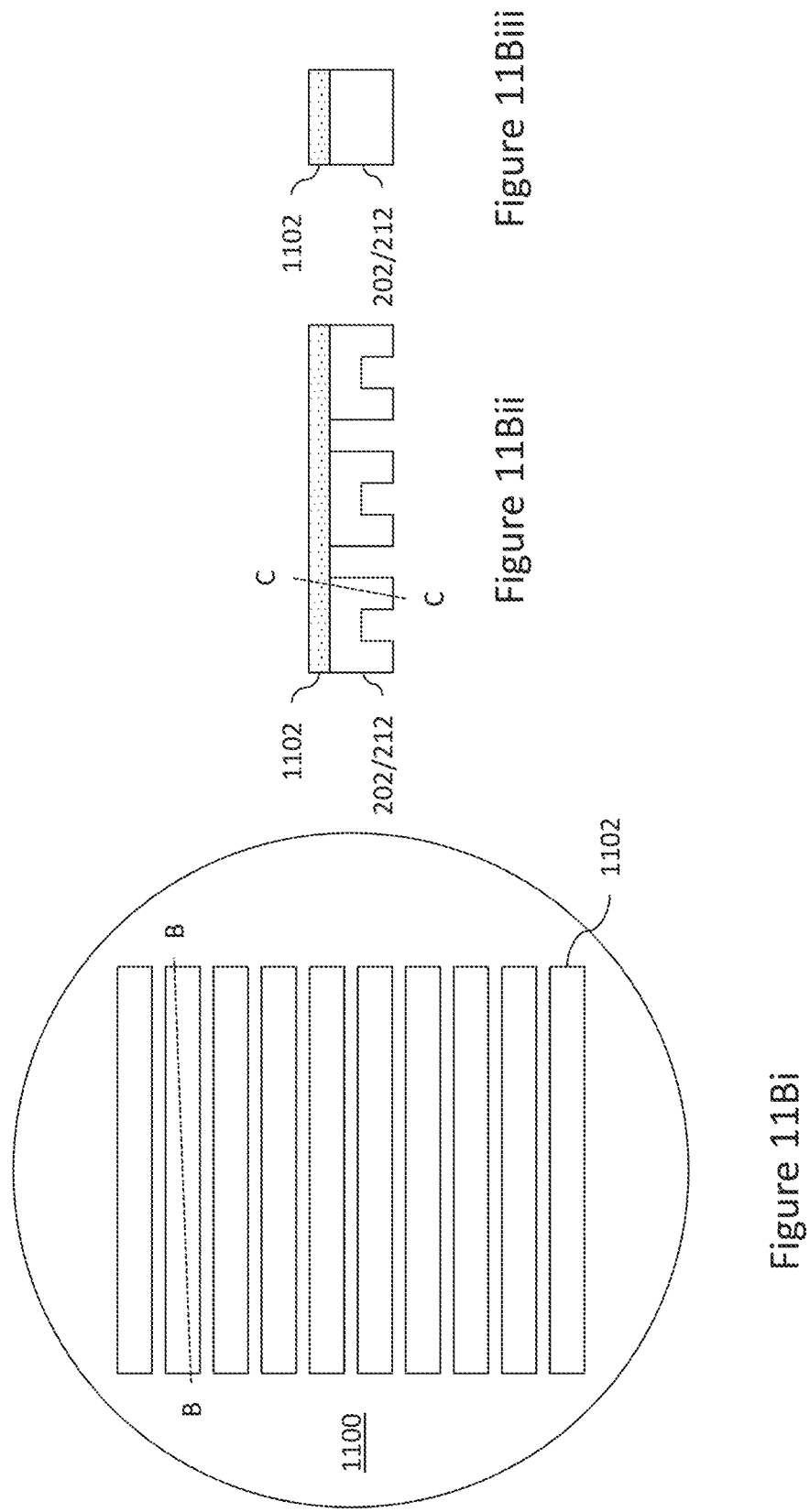

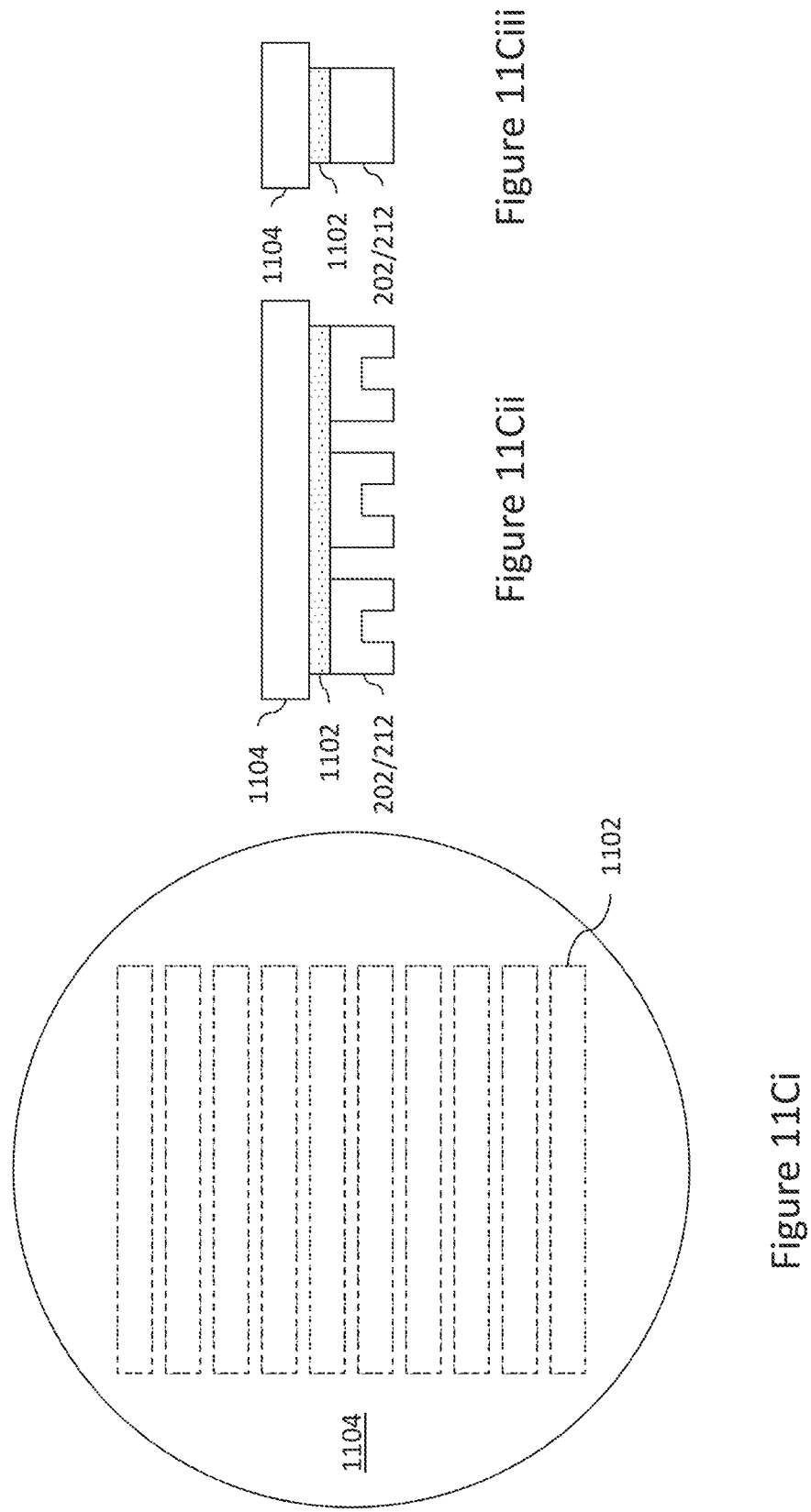

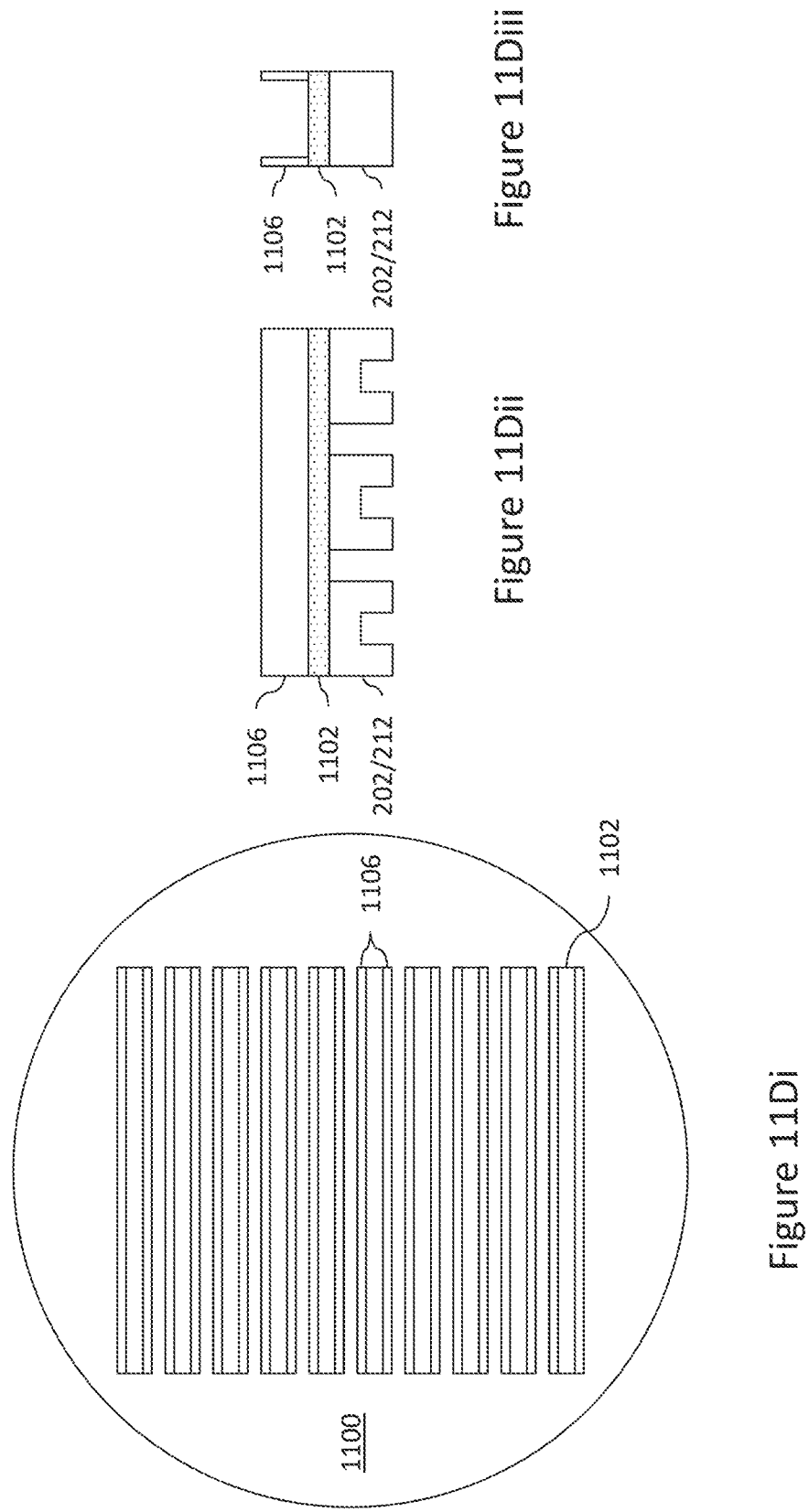

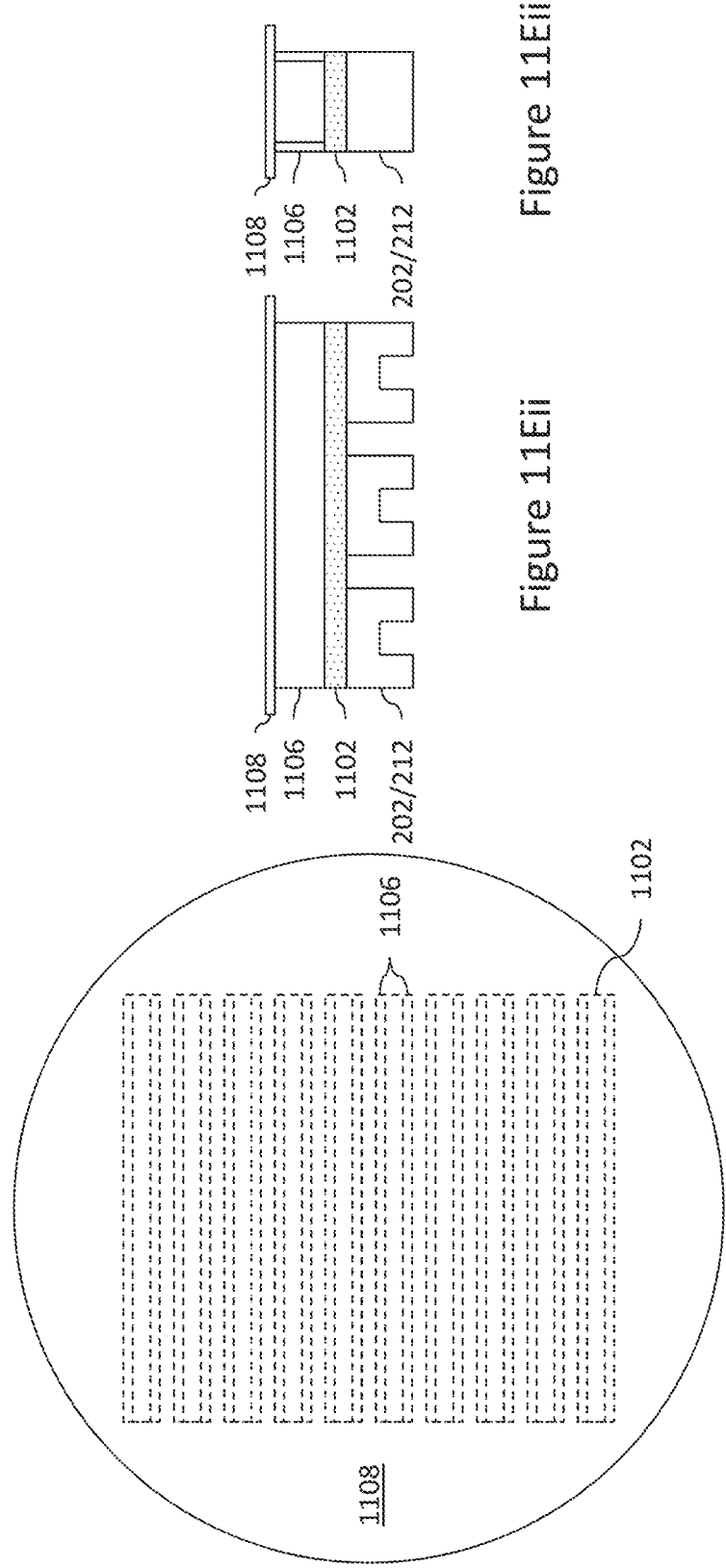

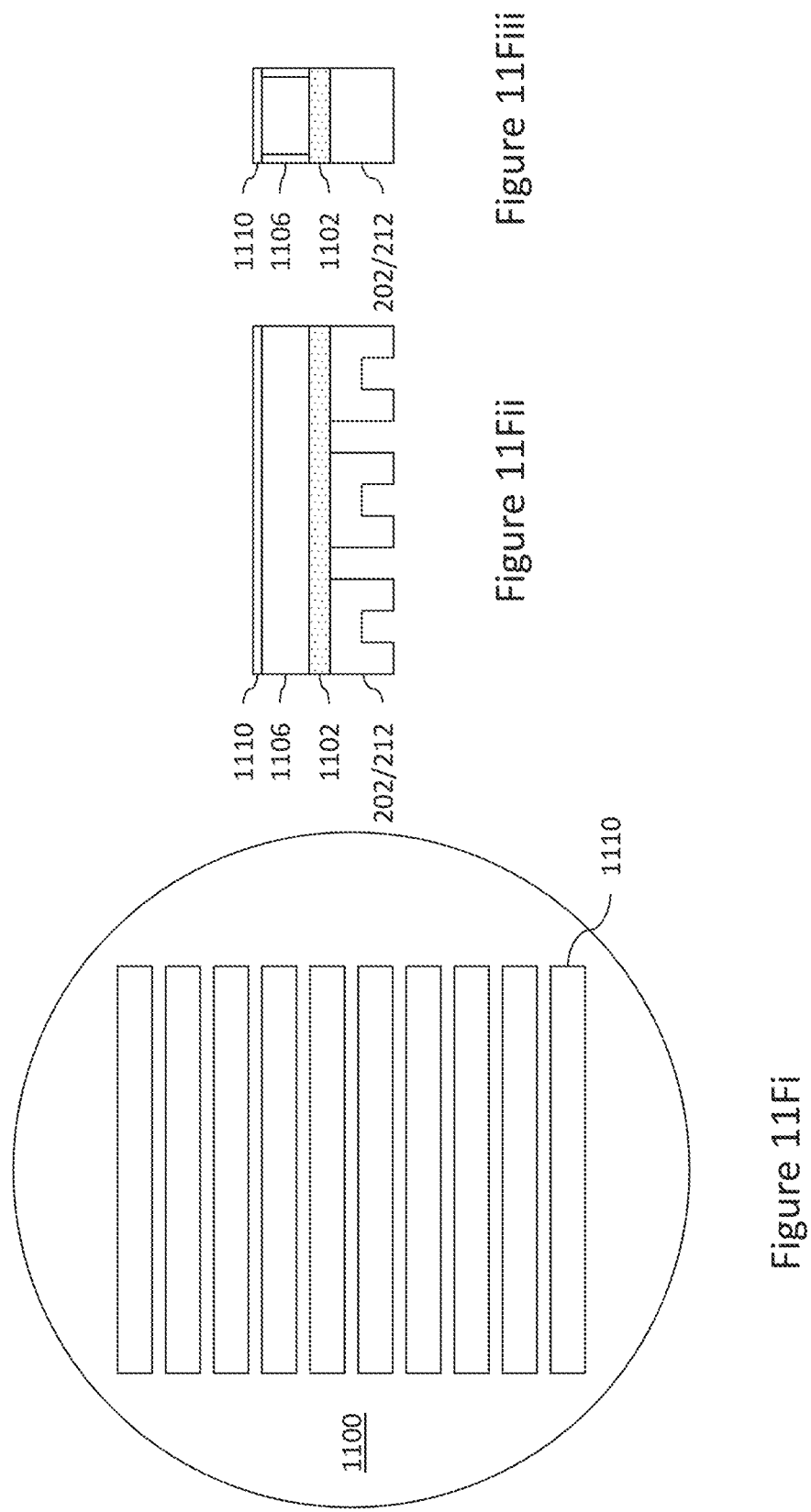

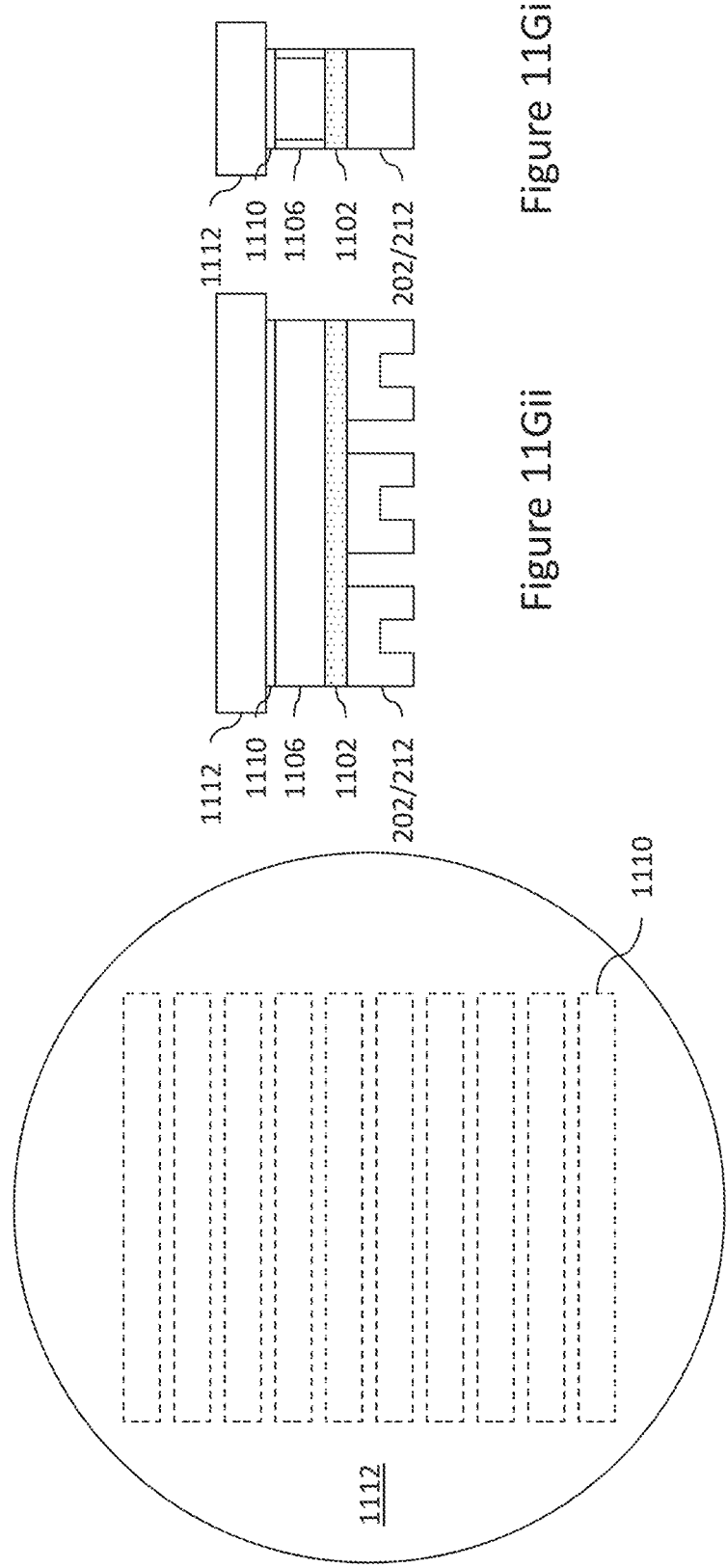

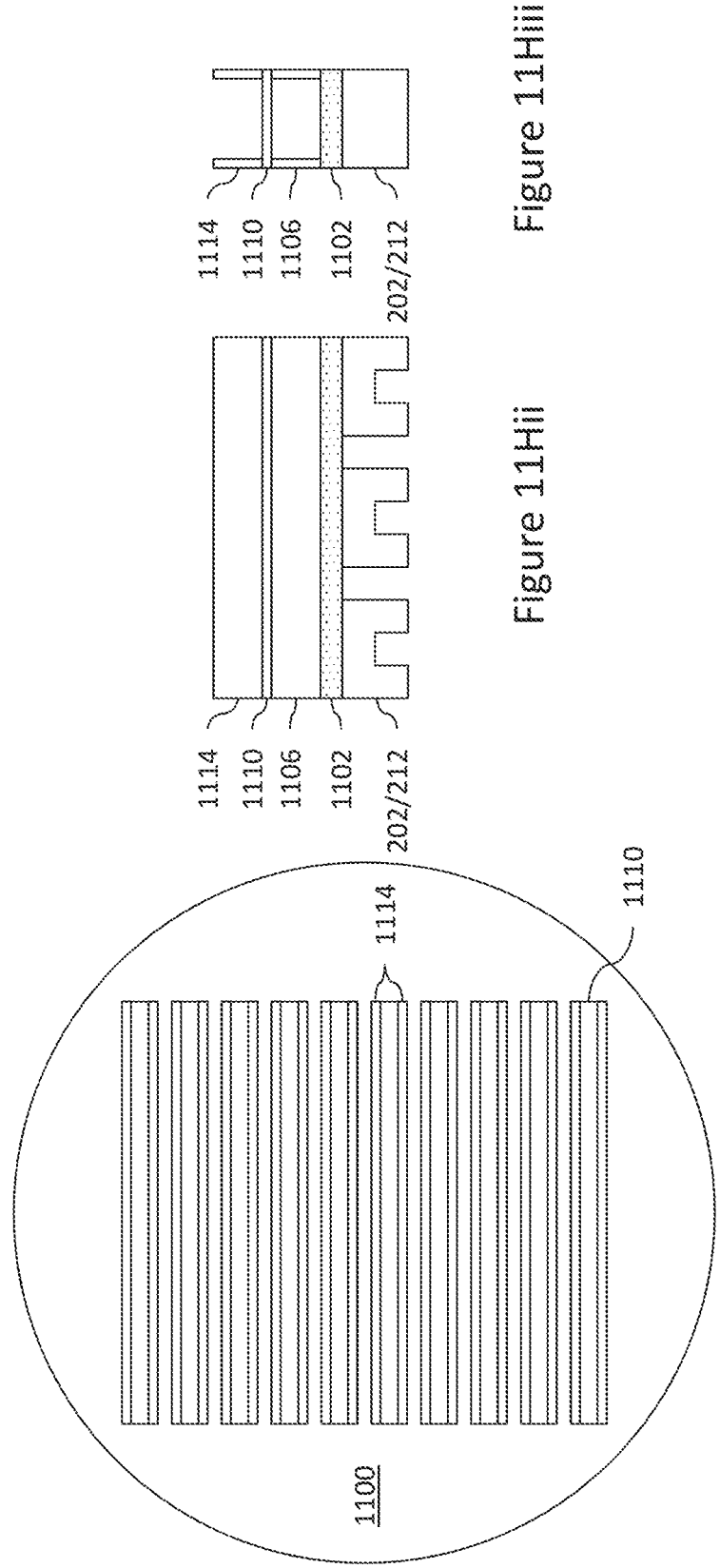

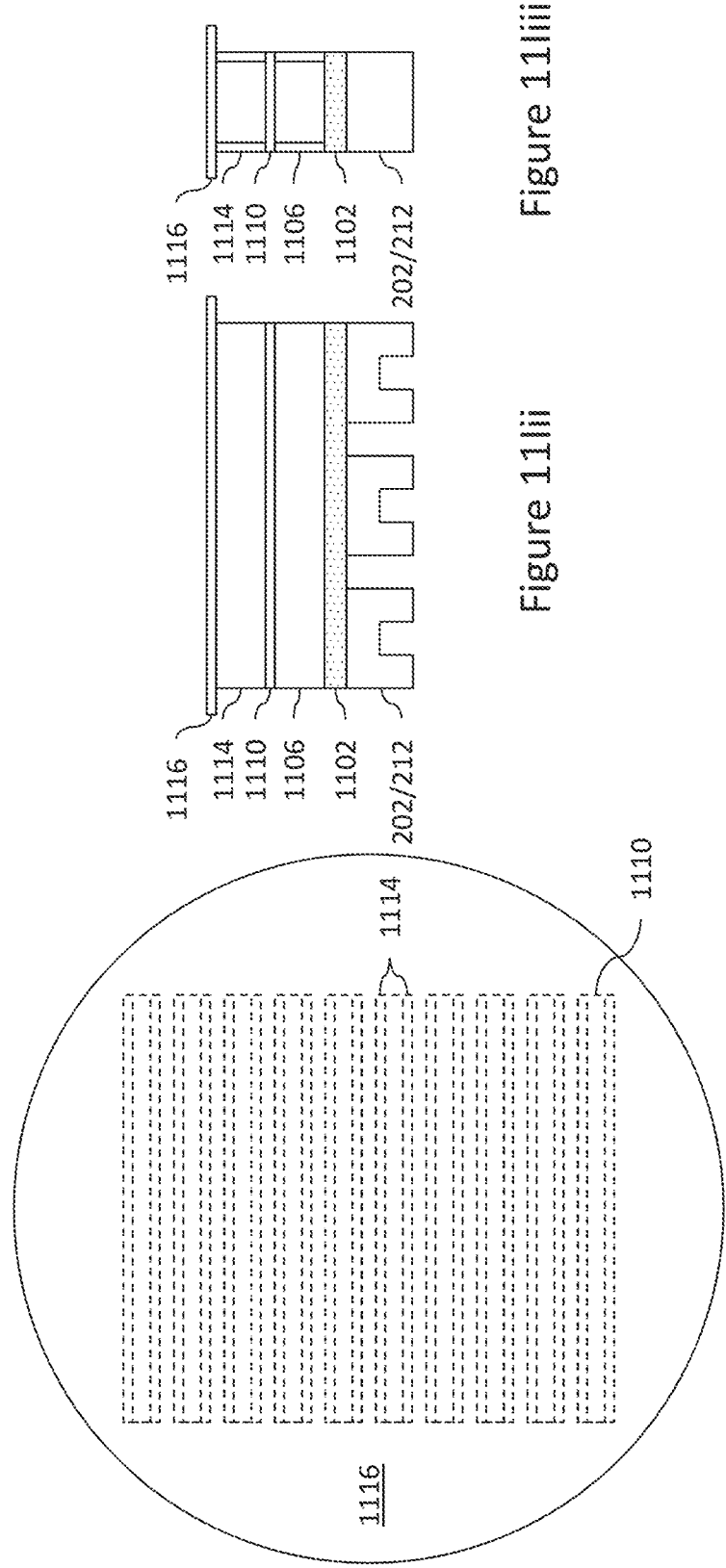

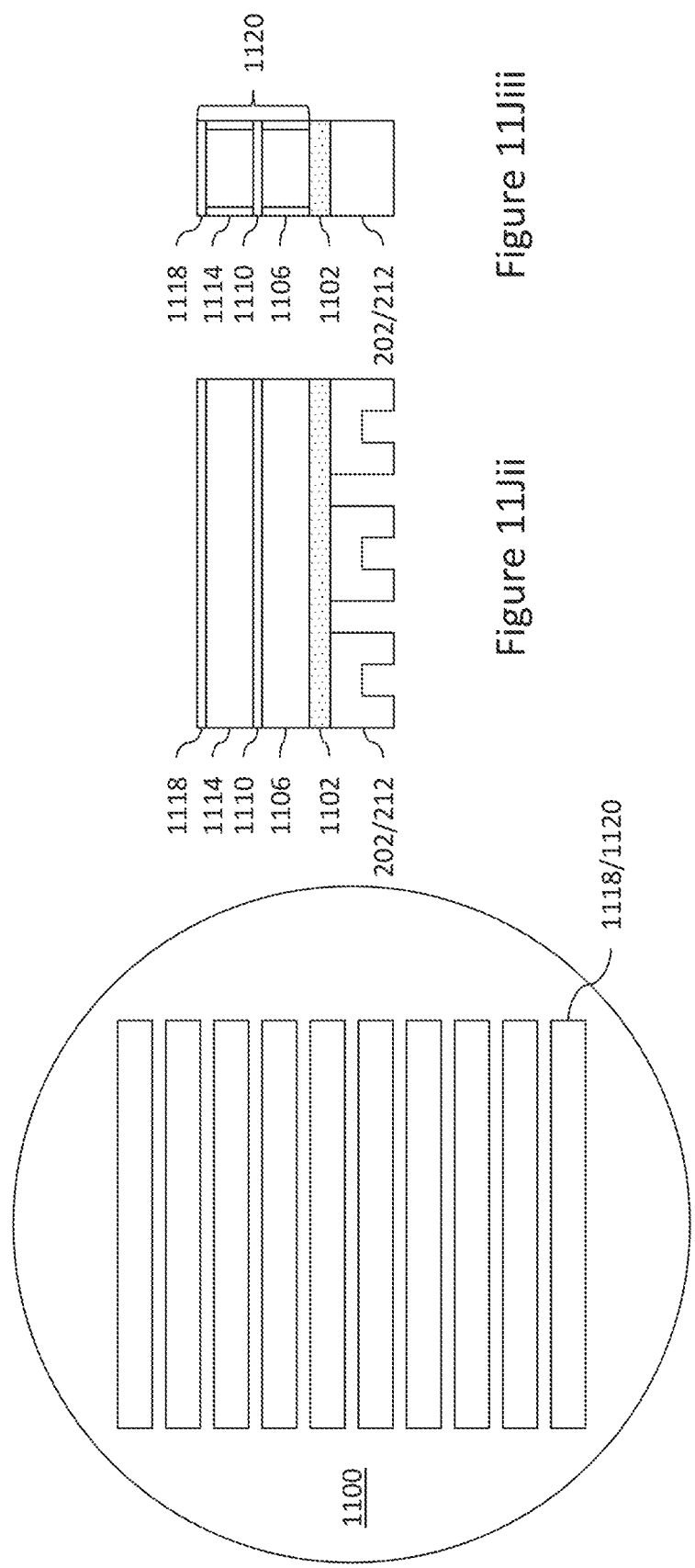

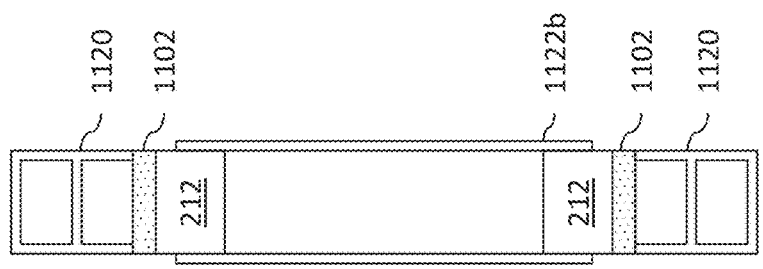
Figure 11Kiii
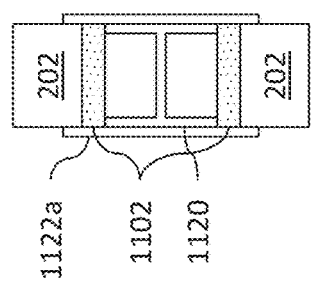
Figure 11Kii
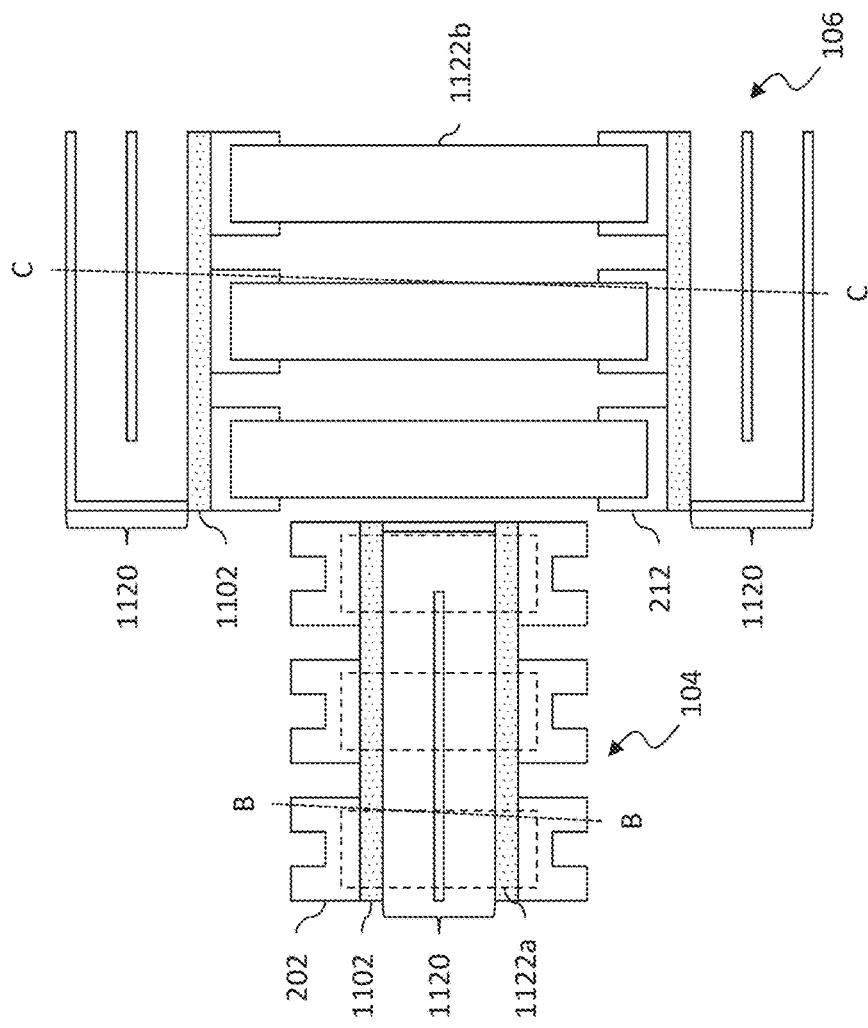
Figure 11Ki

ARTIFICIAL MUSCLE FIBERS INCLUDING COOLING AND A METHOD OF MANUFACTURE THEREOF

TECHNICAL FIELD

This disclosure relates generally to artificial muscle fibers and, in particular embodiments, to an electromagnetic actuator with cooling for artificial muscle fibers and a method of manufacture thereof.

BACKGROUND

Actuators are needed in robotics applications, and there is wide development of artificial muscles fibers based on various actuators technologies. Stiff motion actuators remain at their reached position, while soft or compliant actuators allow deviations from its own equilibrium position. Typical actuators also make use of permanent magnets.

Several parameters are normally taken into account, in trying to develop actuators for robotics applications. Some of them can be directly compared with biological muscle performances, like stress, stroke, speed, etc., while others (e.g., applied voltage, motion control, production method, etc.) expand the benchmark of various actuators and identify possible application areas. Improved actuation of artificial muscles fibers may be needed.

SUMMARY

In accordance with an embodiment, an artificial muscle fiber includes an external fiber including a first linear array of actuators attached to a first flexible tape wire, the first linear array of actuators having protrusions directed in a first direction; a first cooling channel attached to the first flexible tape wire opposite the first linear array of actuators; and an internal fiber including a second linear array of actuators attached to a second flexible tape wire, the second linear array of actuators having protrusions directed in a second direction opposite to the first direction. In an embodiment, the artificial muscle fiber further includes a second cooling channel attached to the second flexible tape wire opposite the second linear array of actuators. In an embodiment, the first flexible tape wire forms a wall of the first cooling channel. In an embodiment, the first flexible tape wire includes struts attached to the actuators of the first linear array of actuators, the struts extending through a wall of the first cooling channel disposed between the first flexible tape wire and the first linear array of actuators. In an embodiment, the artificial muscle fiber further includes a second external fiber including a third linear array of actuators, wherein each of the actuators of the first linear array of actuators are connected to one of the actuators of the third linear array of actuators using a plurality of connectors. In an embodiment, the connectors are non-ferromagnetic. In an embodiment, the first flexible tape wire and the second flexible tape wire include integrated power and logic electronics for controlling switching of the first linear array of actuators and the second linear array of actuators.

In accordance with another embodiment, an artificial muscle fiber includes an internal fiber, including a first flexible tape; a first array of actuators protruding in a first direction from a major surface of the first flexible tape; a second flexible tape; a second array of actuators protruding in a second direction from a major surface of the second flexible tape, the first direction being opposite to the second direction; and a first channel disposed between the first flexible tape and the second flexible tape; and an external fiber, including an opening within which a portion of the internal fiber is positioned; a third flexible tape defining a first sidewall of the opening; a fourth flexible tape defining a second sidewall of the opening; a third array of actuators protruding in the second direction from a major surface of the third flexible tape towards the first array of actuators; and a fourth array of actuators protruding in the first direction from a major surface of the fourth flexible tape towards the second array of actuators. In an embodiment, the internal fiber further includes a second channel disposed between the first flexible tape and the second flexible tape, a first chamber of the first channel being isolated from a second chamber of the second channel. In an embodiment, an inlet of the first channel is proximal the first flexible tape, an outlet of the first channel is distal the first flexible tape, an inlet of the second channel is proximal the second flexible tape, and an outlet of the second channel is distal the second flexible tape. In an embodiment, the artificial muscle fiber further includes a third channel attached to the third flexible tape opposite the third array of actuators and a fourth channel attached to the fourth flexible tape opposite the fourth array of actuators. In an embodiment, the artificial muscle fiber further includes a third channel surrounding the third flexible tape and a fourth channel surrounding the fourth flexible tape portions of the third flexible tape extending through the third channel to the third array of actuators, and portions of the fourth flexible tape extending through the fourth channel to the fourth array of actuators. In an embodiment, the first channel is welded to the first flexible tape. In an embodiment, the first array of actuators is bonded to the second array of actuators by a first plurality of connectors comprising a non-ferromagnetic material. In an embodiment, the third array of actuators is bonded to the fourth array of actuators by a second plurality of connectors comprising a non-ferromagnetic material.

In accordance with yet another embodiment, a method of manufacturing an artificial muscle fiber includes forming a plurality of actuators on a semiconductor substrate; attaching an electronics ribbon to the plurality of actuators; depositing a first polymer over the electronics ribbon; patterning the first polymer to form first channel walls; depositing a second polymer over the first channel walls; patterning the second polymer to form second channel walls, the first channel walls and the second channel walls forming a channel over the electronics ribbon; and dicing the semiconductor substrate to form a half fiber including the plurality of actuators, the electronics ribbon, and the channel. In an embodiment, the first polymer is deposited using spin coating or lamination. In an embodiment, the electronics ribbon is transferred to the plurality of actuators from a second semiconductor substrate. In an embodiment, the method further includes bonding the half fiber to a second half fiber including a second plurality of actuators, a second electronics ribbon, and a second channel, bonding the half fiber to the second half fiber including welding or gluing a plurality of non-ferromagnetic connectors to the plurality of actuators and the second plurality of actuators. In an embodiment, the half fiber is bonded to the second half fiber such that the channel and the second channel are disposed between the electronic ribbon and the second electronic ribbon.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6A to 6F illustrate motion generated by a switching sequence applied to actuators of an artificial muscle fiber, in accordance with an embodiment of the present disclosure;

FIGS. 7A to 7J illustrate a method of manufacturing an actuator of an artificial muscle fiber, in accordance with an embodiment of the present disclosure;

FIGS. 11A-11Kiii illustrate a method of manufacturing an artificial muscle fiber including channels, in accordance with an embodiment of the present disclosure;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Artificial muscle fibers and compliant actuators are being developed for robotics applications (e.g., in industry, household appliances, prosthetic devices, wearable robotics, or robotic anthropomorphization, and the like) and the like. This disclosure presents an electromagnetic actuator including cooling for artificial muscle fibers and a method of manufacture thereof. In particular, an electromagnetic actuator based on a linear synchronous motor is presented. The electromagnetic actuator may include passive cooling, active cooling, and the like. The electromagnetic actuator is designed to be modular, scalable, and does not use permanent magnets. The characteristics of the proposed electromagnetic actuator (e.g., in terms of force, stroke, density, and other performance features) are matched with parameters of natural muscles. Besides performance, design choices of the proposed device have been driven by the desire to achieve high throughput production processes. Therefore, a simple repetitive flat structure has been chosen for the proposed electromagnetic actuator, as well as any passive or active cooling devices included in the proposed electromagnetic actuator, with the goal of easy manufacturing based on assembly automated production machines. Further, when down-scaling is necessary to build sub-millimetric sectional fibers, a method of manufacturing the disclosed electromagnetic actuator based on integrated circuits technology is proposed to achieve high levels of integration and production throughput.

Figure 1:
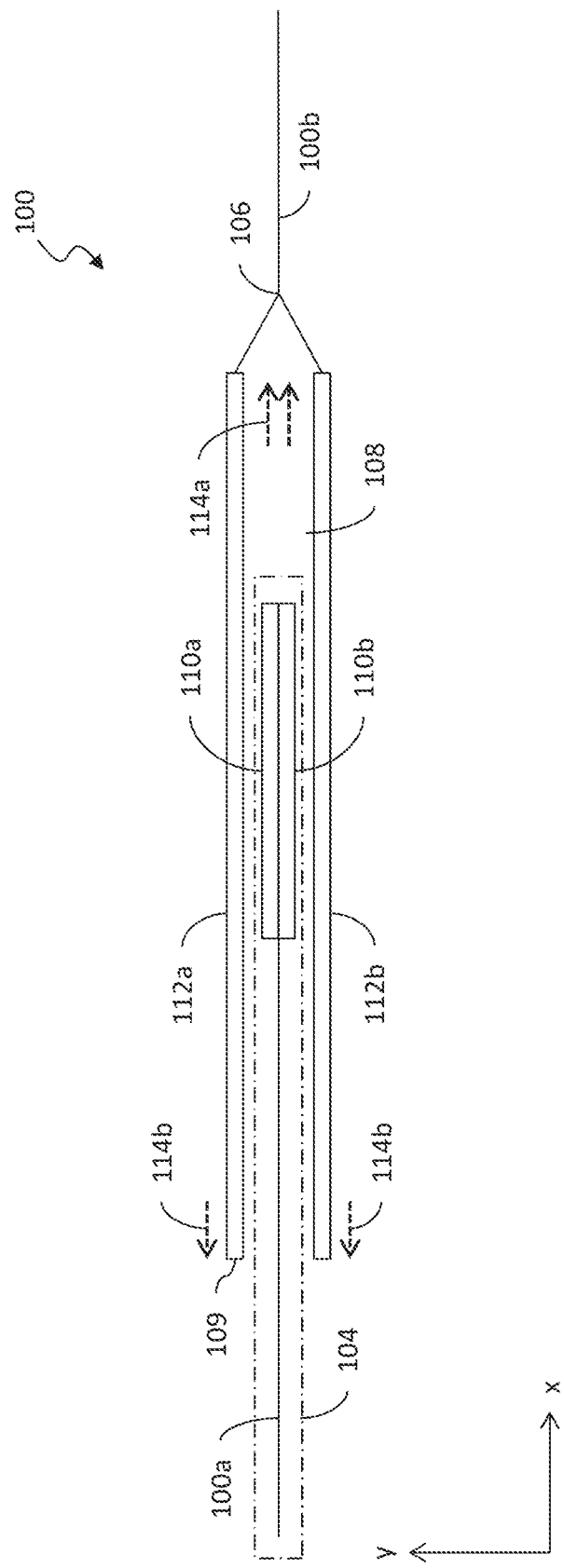
FIG. 1 illustrates a simplified schematic diagram of an artificial muscle fiber including an internal fiber and an external fiber, in accordance with an embodiment of the present disclosure.

FIG. 1 illustrates a schematic diagram of an artificial muscle fiber 100, in accordance some embodiments. Specifically, FIG. 1 illustrates a two-dimensional longitudinal view of the artificial muscle fiber 100 in the x-y plane. The artificial muscle fiber 100 includes an internal fiber 104 and an external fiber 106. Various components of the artificial muscle fiber 100 are indicated in FIG. 1 as blocks, and further details regarding these components are provided in FIGS. 2A to 2D. As described above, the artificial muscle fiber 100 may mimic the movement, force, and stroke of a biological muscle fiber.

At least a portion of the internal fiber 104 may be positioned within the external fiber 106. For example, the internal fiber 104 may be positioned within an opening 108 of the external fiber 106. A first end 100a of the artificial muscle fiber 100 may be fixed (e.g., using a bonded wire) to a first load (not separately illustrated), while a second end 100b of the artificial muscle fiber 100 may be fixed (e.g., using a bonded wire) to a second load (not separately illustrated) in a manner similar to a natural muscle fixed to a limb of a skeleton through tendons in a living being. The first end 100a of the artificial muscle fiber 100 may correspond to an end portion of the internal fiber 104 farthest from the mouth 109 of the opening 108, while the second end 100b of the artificial muscle fiber 100 may correspond to an end portion of the external fiber 106 farthest from the mouth 109 of the opening 108.

The internal fiber 104 includes a first array of actuators 110a and a second array of actuators 110b formed along a portion of the internal fiber 104 opposite the first end bow of the artificial muscle fiber 100. The first array of actuators 110a and the second array of actuators 110b are configured to be positioned within the opening 108 of the external fiber 106. The external fiber 106 also includes a first array of actuators 112a and a second array of actuators 112b that define the opening 108. The actuators of the first array of actuators 110a of the internal fiber 104 face the actuators of the first array of actuators 112a of the external fiber 106. The actuators of the second array of actuators 110b of the internal fiber 104 face the actuators of the second array of actuators 112b of the external fiber 106. Stated differently, the artificial muscle fiber 100 includes an outer double strip made of two parallel actuator arrays 112a and 112b and an inner double strip made up of two parallel actuator arrays 110a and 110b.

Each actuator of the actuator arrays 110a, 110b, 112a, and 112b may be identical in size (e.g., as discussed below in reference to FIGS. 5A and 5B). However, as shown in FIG. 1, the first array of actuators 112a and the second array of actuators 112b of the external fiber 106 have a length greater than a length of the first array of actuators 110a and the second array of actuators 110*b* of the internal fiber 104. As such, the actuator arrays 112*a* and 112*b* include greater numbers of actuators than the actuator arrays 110*a* and 110*b*.

The actuator arrays 112*a* and 112*b* and the actuator arrays 110*a* and 110*b* cooperatively function as a linear synchronous motor. As an example, the actuator arrays 112*a* and 112*b* of the external fiber 106 and the actuator arrays 110*a* and 110*b* of the internal fiber 104 interact to generate forces that decrease the linear distance between the opposing ends 100*a* and 100*b* of the artificial muscle fiber 100 (e.g., mimicking contraction of a natural muscle fiber). This generates forces 114*a* in the internal fiber 104 that pull the internal fiber 104 into the opening 108 of the external fiber 106 and forces 114*b* in the external fiber 106 that move the mouth 109 of the opening 108 of the external fiber 106 toward the first end 100*a* of the artificial muscle fiber 100.

Figure 2A:
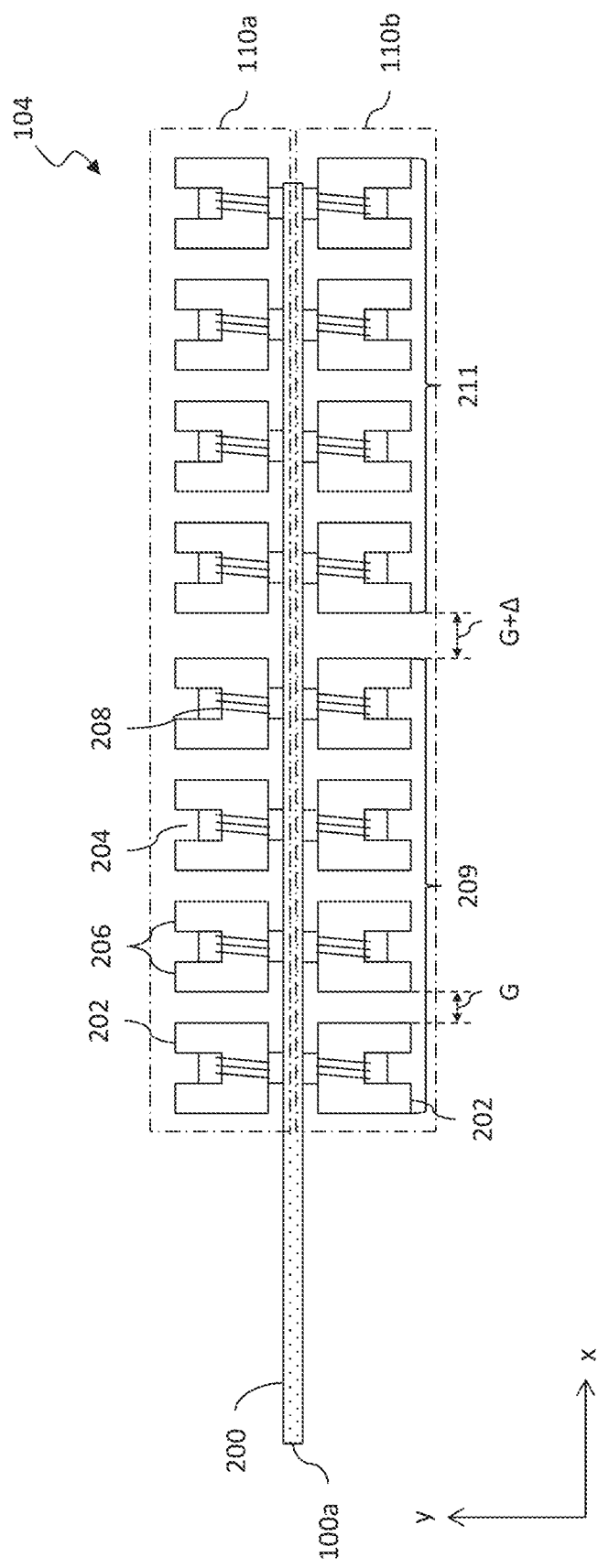
FIGS. 2A to 2D illustrate a detailed schematic diagram of an artificial muscle fiber, in accordance with an embodiment of the present disclosure.
Figure 2B:
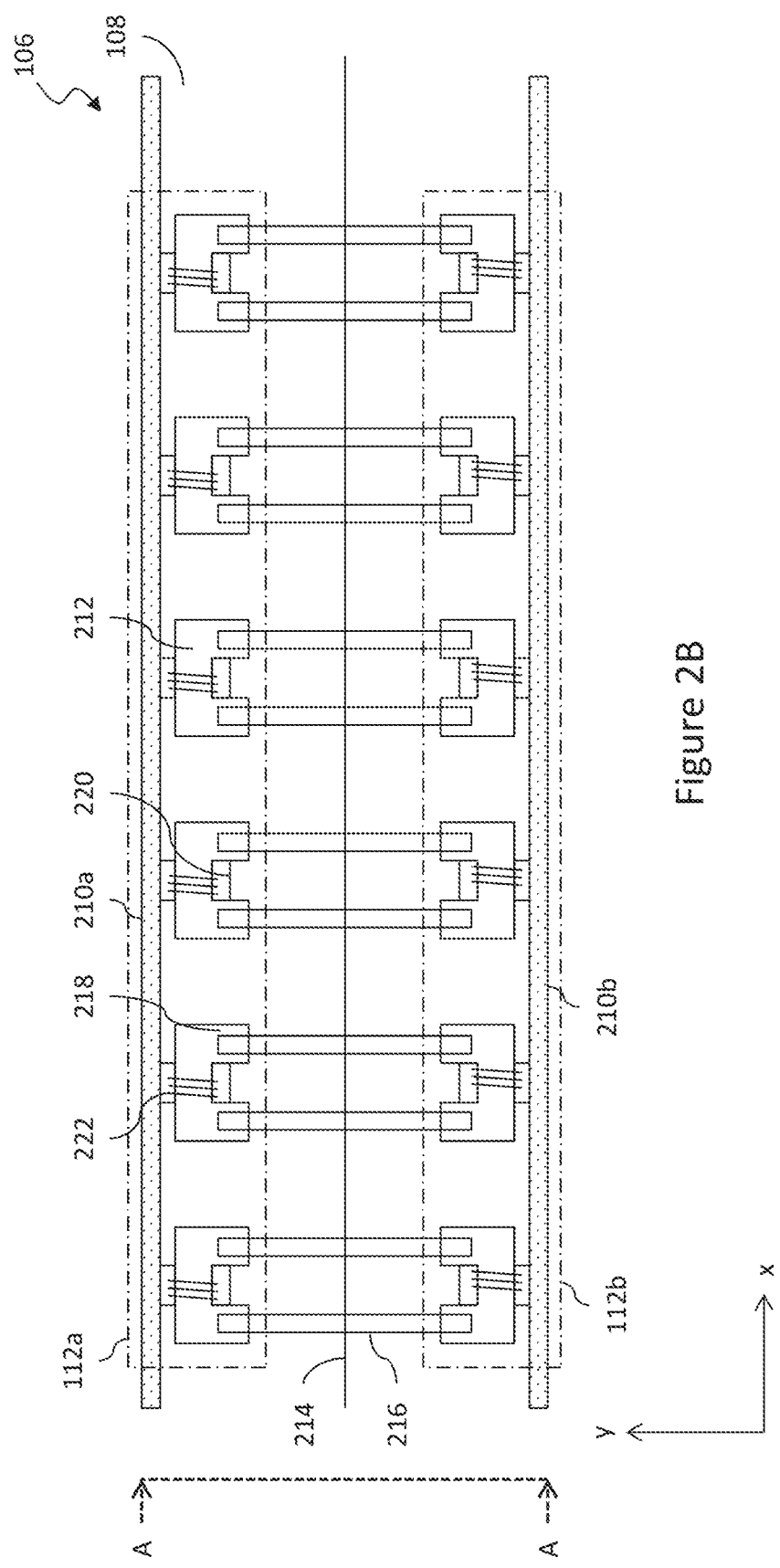
Figure 2C:
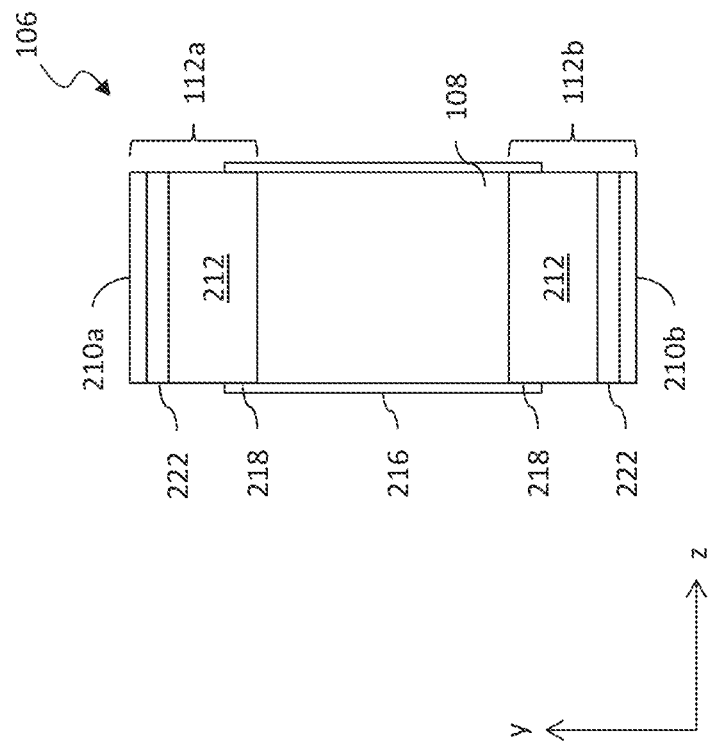
Figure 2D:
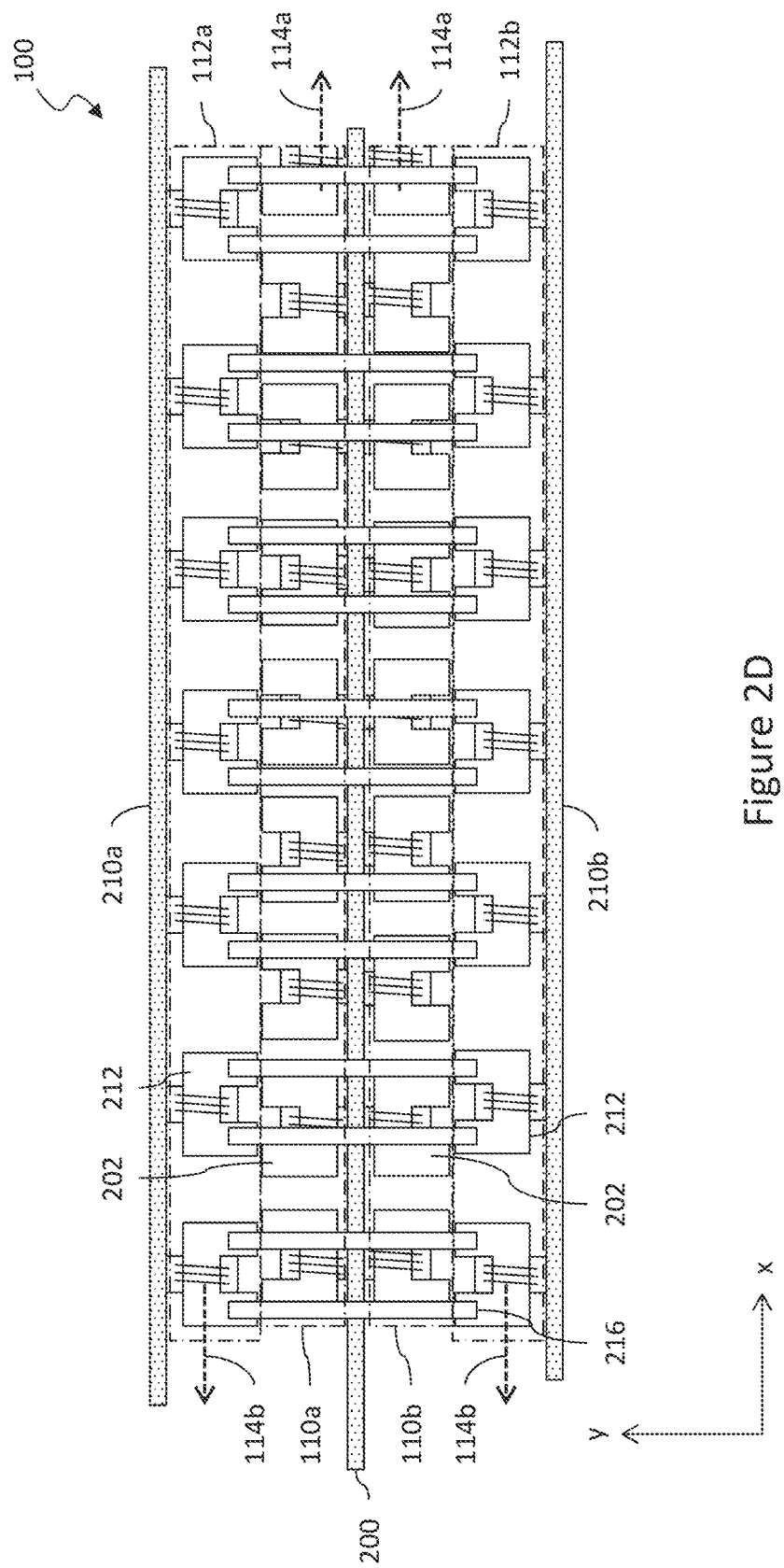

FIG. 2A illustrates the structure of the internal fiber 104 and illustrates the first array of actuators 110*a* and the second array of actuators 110*b* of the internal fiber 104. FIGS. 2B and 2C illustrate the structure of the external fiber 106 and its actuators. FIG. 2D illustrates the relative position and placement of the internal fiber 104 and the external fiber 106 in the artificial muscle fiber 100.

FIG. 2A illustrates a longitudinal view of a portion of the internal fiber 104. The internal fiber 104 includes a flexible tape wire 200. The first array of actuators 110*a* and the second array of actuators 110*b* of the internal fiber 104 are electrically and mechanically coupled to the flexible tape wire 200, which includes electrical busses and driving electronics for the actuator arrays 110*a*, 110*b*. The distribution of the electrical busses and driving electronics in the flexible tape wire 200 is discussed in further detail below in reference to FIG. 12. In some embodiments, the flexible tape wire 200 may be referred to as an electronics ribbon.

The first array of actuators 110*a* and the second array of actuators 110*b* are arranged on opposite sides of the flexible tape wire 200. As illustrated in FIG. 2A, the first array of actuators 110*a* and the second array of actuators 110*b* are arranged in a symmetrical manner about the flexible tape wire 200, and there are an equal number of actuators 202 in the first array of actuators 110*a* and the second array of actuators 110*b*. FIG. 2A further illustrates that for every actuator 202 in the first array of actuators 110*a*, there may be a correspondingly positioned actuator 202 in the second array of actuators 110*b*. Although FIG. 2A illustrates eight actuators 202 in each of the first array of actuators 110*a* and the second array of actuators 110*b*, any number of actuators may be included in the actuator arrays 110*a* and 110*b*. In the following description, details regarding the first array of actuators 110*a* may apply equally to the second array of actuators 110*b*.

Each of the actuators 202 of the actuator arrays 110*a* and 110*b* may be formed from a soft magnetic material (e.g., a ferromagnetic material or a magnetic material having a relative magnetic permeability from $10^2$ to $10^6$). Each of the actuators 202 may be formed to include protrusions 206 (e.g., teeth) that are separated by a notch 204. As illustrated in FIG. 2A, each of the actuators 202 may be a U-shaped actuator in which the protrusions 206 are directed away from a major surface of the flexible tape wire 200 to which the actuator 202 is attached. Each of the actuators 202 further includes respective windings 208 between the protrusions 206 and around the soft magnetic material at the notch 204 of the actuator 202. The windings 208 provide an electrical current that induces a magnetic field in the respective actuator 202 so that actuation of the artificial muscle fiber 100 can be achieved (as described in greater detail below in reference to FIGS. 6A to 6F).

As depicted in FIG. 2A, the actuator arrays 110*a* and 110*b* are each divided into a first group 209 and a second group 211. Within the first group 209, adjacent (e.g., immediately adjacent) actuators 202 are separated by a dimension G. Similarly, within the second group 211, adjacent (e.g., immediately adjacent) actuators 202 are separated by the dimension G. The actuators 202 of the first group 209 may be separated from the actuators 202 of the second group 211 by a dimension (G+Δ). In other words, an extra separation of Δ is provided between adjacent (e.g., immediately adjacent) actuators 202 that are in different groups. As a result of the extra separation Δ, the pitch of the actuators 202 along the length of the actuator arrays 110*a* and 110*b* is not constant.

FIG. 2B illustrates a longitudinal view of a portion of the external fiber 106 and FIG. 2C illustrates a side view of a portion of the external fiber 106 along the line A-A illustrated in FIG. 2B. The external fiber 106 includes opposing flexible tape wires 210*a* and 210*b* that form opposite external walls of the external fiber 106. The flexible tape wires 210*a* and 210*b* define the opening 108 of the external fiber 106. The actuator arrays 112*a* and 112*b* of the external fiber 106 are formed within the opening 108 and are electrically and mechanically coupled to the flexible tape wires 210*a* and 210*b*, which include electrical busses and driving electronics for the actuator arrays 112*a* and 112*b*. The structure and distribution of the flexible tape wires 210*a* and 210*b* may be similar to that of flexible tape wire 200 and is discussed in greater detail below in reference to FIG. 12.

Each of the actuator arrays 112*a* and 112*b* of the external fiber 106 includes a plurality of actuators 212 that protrude into the opening 108 defined by the opposing flexible tape wires 210*a* and 210*b*. As illustrated in FIG. 2B, the actuators 212 are arranged in a symmetrical manner about a central longitudinal axis 214 of the external fiber 106, and there are an equal number of the actuators 212 in the actuator arrays 112*a* and 112*b*. An actuator 212 in the first array of actuators 112*a* may have a correspondingly positioned actuator 212 in the second array of actuators 112*b*, and the correspondingly positioned actuators 212 may be bonded to one another by connectors 216 (e.g., rigid paramagnetic connectors) so as to achieve structural stability and integrity of the external fiber 106.

In general, the number of actuators 212 in each of the actuator arrays 112*a* and 112*b* of the external fiber 106 is greater (e.g., at least two times greater) than the number of actuators in each of the actuator arrays 110*a* and 110*b* of the internal fiber 104. In accordance with some embodiments, the external fiber 106 may include from 20 to 200 actuators 212, such as 63 actuators or 100 actuators, in each of the actuator arrays 112*a* and 112*b*. The actuators 212 may have a pitch from about 0.2 mm to about 2 mm, such as about 1 mm. Copper buses included in the flexible tape wires 200, 210*a*, and 210*b* (discussed in greater detail below with respect to FIG. 12) may have a thickness from about 20 μm to about 200 μm, such as about 100 μm.

Similar to the actuators 202 of the internal fiber 104, each of the actuators 212 of the external fiber 106 may be formed from a soft magnetic material (e.g., a ferromagnetic material or a magnetic material having a relative magnetic permeability from $10^2$ to $10^6$). Each of the actuators 212 may be formed to include protrusions 218 (e.g., teeth) that are separated by a notch 220. In the example illustrated in FIG. 2B, the rigid paramagnetic connectors 216 are attached to protrusions 218 of opposing actuators 212. As further illustrated in FIG. 2B, as a result of this structure, each of the actuators 212 may be a U-shaped actuator in which the protrusions 218 are directed away from a major surface of the respective flexible tape wires 210a and 210b and into the opening 108. Each of the actuators 212 also includes respective windings 222 between the protrusions 218 and around the soft magnetic material at the notch 220 of the actuator 212 so that actuation of the artificial muscle fiber 100 can be achieved.

FIG. 2D illustrates a longitudinal view of a portion of the internal fiber 104 including the actuator arrays 110a and 110b inserted into the external fiber 106. As illustrated in FIG. 2D, the internal fiber 104 may be inserted into the external fiber 106 such that there is a gap between the actuators 202 of the internal fiber 104 and the actuators 212 of the external fiber 106. As such, no physical contact is made between the actuators 202 of the internal fiber 104 and the actuators 212 of the external fiber 106. The flexible tape wire 200 of the internal fiber 104 is aligned to the central longitudinal axis 214 of the external fiber 106. As a result, there is a spatial symmetry between the first array of actuators 110a and the first array of actuators 112a in the top half of the artificial muscle fiber 100 and the second array of actuators 110b and the second array of actuators 112b in the bottom half of the artificial muscle fiber 100. This arrangement allows the internal fiber 104 to slide into the opening 108 of the external fiber 106 and reciprocal attraction along the longitudinal axis of the artificial muscle fiber to produce traction forces 114a and 114b on the ends 100a and 100b of the internal fiber 104 and the external fiber 106, respectively, which results in actuation of the artificial muscle fiber 100.

Actuating the artificial muscle fiber 100 may cause heat to be generated in the actuators 202 and the actuators 212. A maximum operating temperature of the artificial muscle fiber 100 along the flexible tape wires 200, 210a, and 210b may be from about 50° C. to about 200° C., such as about 100° C. Operating the artificial muscle fiber 100 at temperatures above the maximum operating temperature may cause a reduction in the performance of the artificial muscle fiber 100, as well as defects in the artificial muscle fiber 100. As such, it is desirable to provide cooling for the artificial muscle fiber 100. In the embodiment illustrated in FIGS. 1 to 2D, the artificial muscle fiber 100 may be passively cooled. For example, the flexible tape wires 200, 210a, and 210b may be formed of thermally conductive materials. Heat generated in the actuators 202 and the actuators 212 may be transferred to the flexible tape wire 200 and the flexible tape wires 210a and 210b, respectively, through conduction. The first end 100a and the second end mob of the artificial muscle fiber 100 may be maintained at a relatively low temperature, such as from about 0° C. to about 40° C. or about 25° C., during the actuation of the artificial muscle fiber 100 such that the actuators 202 and 212 are cooled.

The passively cooled artificial muscle fiber 100 may maintain a maximum continuous sustainable pressure of about 0.05 MPa for a period of about 2 minutes with a winding current of about 0.03 A applied to six actuators 202 and 212 along the artificial muscle fiber 100. The artificial muscle fiber 100 may reach a maximum fiber temperature of about 40° C. after about 2 minutes. The passively cooled artificial muscle fiber 100 may reach a peak pressure of about 0.35 MPa for a period of about 3 seconds (with the artificial muscle fiber 100 reaching a maximum temperature of about 50° C.) with a winding current of about 0.12 A applied to six actuators 202 and 212 along the artificial muscle fiber 100. A density of the actuators 202 and 212 in the passively cooled artificial muscle fiber 100 may be from about 4.9 g/cm$^3$, when the passively cooled artificial muscle fiber 100 is in a fully contracted position, to about 2.4 g/cm$^3$, when the passively cooled artificial muscle fiber 100 is in a fully extended position. A density of the actuators 202 and 212 in the passively cooled artificial muscle fiber 100 may be about 3.4 g/cm$^3$ at an optimal resting length (e.g., when the actuator arrays 110a and 110b of the internal fiber 104 are just inserted into the external fiber 106). Passively cooling the artificial muscle fiber 100 allows for the artificial muscle fiber 100 to produce greater forces without overheating than artificial muscle fibers that do not include passive cooling. Further, the passively cooled artificial muscle fiber 100 may have a lower density (e.g., a density closer to that of a natural muscle fiber) than artificial muscle fibers which are not passively cooled.

Figure 3:
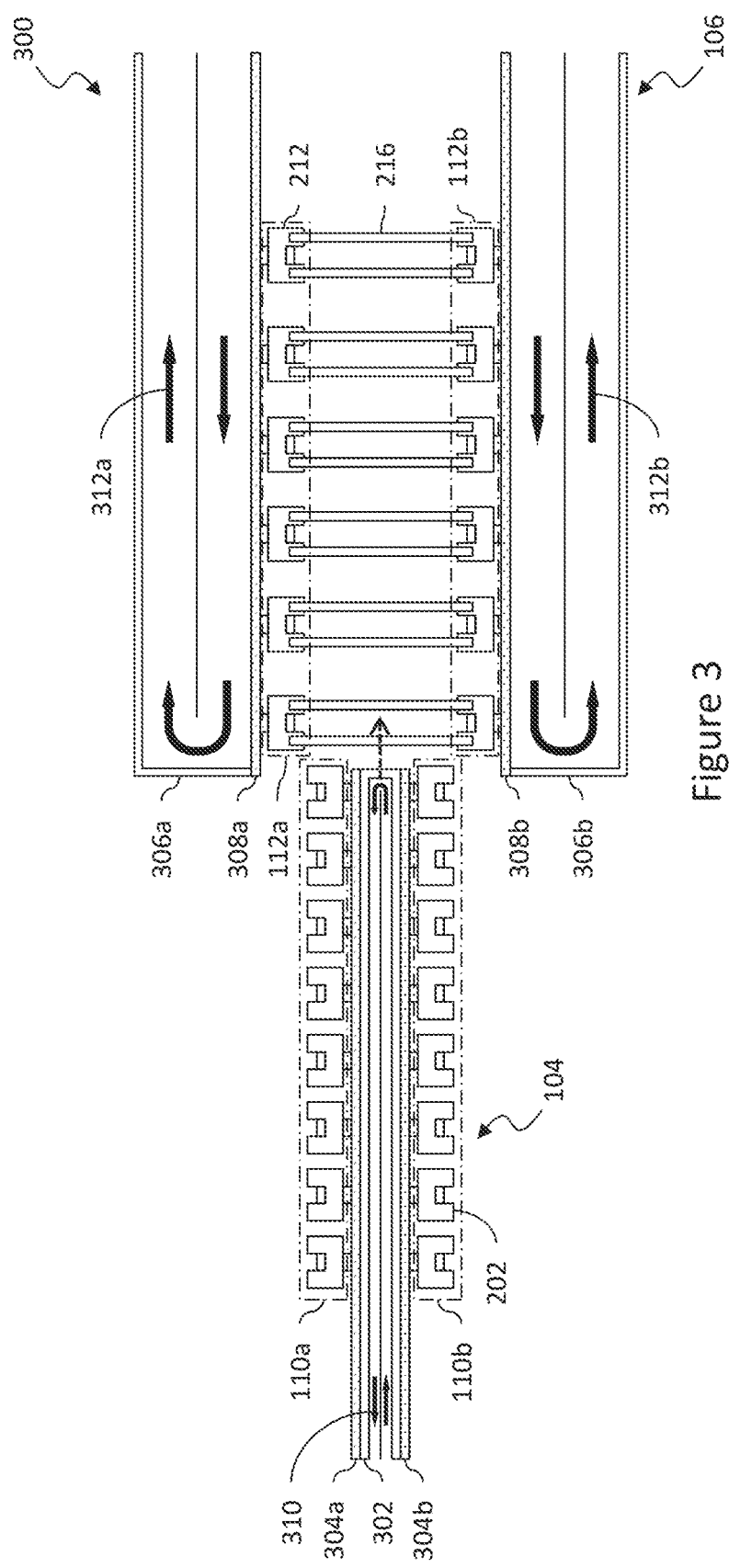
FIG. 3 illustrates a detailed schematic diagram of an actively cooled artificial muscle fiber, in accordance with an embodiment of the present disclosure.

FIG. 3 illustrates an actively cooled artificial muscle fiber 300, in accordance with an embodiment. The actively cooled artificial muscle fiber 300 includes an internal fiber 104 having a first channel 302 mechanically coupled to flexible tape wires 304a and 304b. Actuators 202 in actuator arrays 110a and 110b are electrically and mechanically coupled to the flexible tape wires 304a and 304b, respectively, opposite the first channel 302. The actively cooled artificial muscle fiber 300 further includes an external fiber 106 having second channels 306a and 306b mechanically coupled to flexible tape wires 308a and 308b, respectively. Actuators 212 in actuator arrays 112a and 112b are electrically and mechanically coupled to the flexible tape wires 308a and 308b, respectively, opposite the channels 306a and 306b.

The channels 302, 306a, and 306b may be used to provide cooling for the actuators 202 and 212 included in the internal fiber 104 and the external fiber 106, respectively. For example, heat generated in the actuators 202 and 212 during actuation of the actively cooled artificial muscle fiber 300 may be transferred through the flexible tape wires 304a, 304b, 308a, and 308b to the channels 302, 306a, and 306b through conduction. A heat transfer fluid, such as water, a liquid coolant solution, or the like may flow through the channels 302, 306a, and 306b and may cool the flexible tape wires 304a, 304b, 308a, and 308b through convection. Arrows 310, 312a, and 312b indicate the flow of the heat transfer fluid through the channels 302, 306a, and 306b, respectively. Although FIG. 3 illustrates a single channel 302 disposed between the flexible tape wires 304a and 304b, multiple channels may be provided, such as two channels. Providing two channels between the flexible tape wires 304a and 304b improves the uniformity of cooling across the actuators 202 of the actuator arrays 110a and 110b.

The heat transfer fluid may flow through the channels 302, 306a, and 306b at a flow rate from about 1 cm/s to about 200 cm/s. An incoming temperature of the heat transfer fluid may be from about 10° C. to about 40° C., such as about 25° C. A pressure drop from inlets of the channels 302, 306a, and 306b may be from about 10 mbar to about 300 mbar, such as about 100 mbar. The channels 302, 306a, and 306b may have a thickness from about 0.1 mm to about 2 mm, such as about 0.5 mm. The external fiber 106 of the actively cooled artificial muscle fiber 300 may include from 50 to 200 actuators 212, such as 100 actuators 212, in each of the actuator arrays 112a and 112b. The actuators 212 may have a pitch from about 0.2 mm to about 2 mm, such as about 1 mm.

The actively cooled artificial muscle fiber 300 may maintain the maximum continuous sustainable pressure of a natural muscle fiber of about 0.05 MPa with a winding current of about 0.12 A applied to six actuators 202 and 212 along the actively cooled artificial muscle fiber 300 for an indefinite period of time. The actively cooled artificial muscle fiber may also maintain a maximum continuous sustainable pressure of about 0.35 MPa with a winding current of about 0.45 A applied to six actuators 202 and 212 along the actively cooled artificial muscle fiber 300 for an indefinite period of time. A density of the actuators 202 and 212 in the actively cooled artificial muscle fiber 300 may be from about 2.1 g/cm$^3$, when the actively cooled artificial muscle fiber 300 is in a fully contracted position, to about 1.4 g/cm$^3$, when the actively cooled artificial muscle fiber 300 is in a fully extended position. A density of the actuators 202 and 212 in the actively cooled artificial muscle fiber 300 may be about 1.7 g/cm$^3$ at an optimal resting length (e.g., when the actuator arrays 110a and 110b of the internal fiber 104 are just inserted into the external fiber 106). The actively cooled artificial muscle fiber 300 is capable of achieving a specific actuation stress very close to the specific actuation stress of a natural muscle fiber. Moreover, actively cooling the artificial muscle fiber 300 allows for the artificial muscle fiber 300 to produce even greater forces than the passively cooled artificial muscle fiber 100 without overheating. Further in the actively cooled artificial muscle fiber 300, materials used to passively cool the artificial muscle fiber (e.g., iron, copper, and the like) are replaced with water having a lower density, thus the actively cooled artificial muscle fiber 300 has a lower density than the passively cooled artificial muscle fiber 100 (e.g., a density closer to that of a natural muscle fiber).

Figure 4:
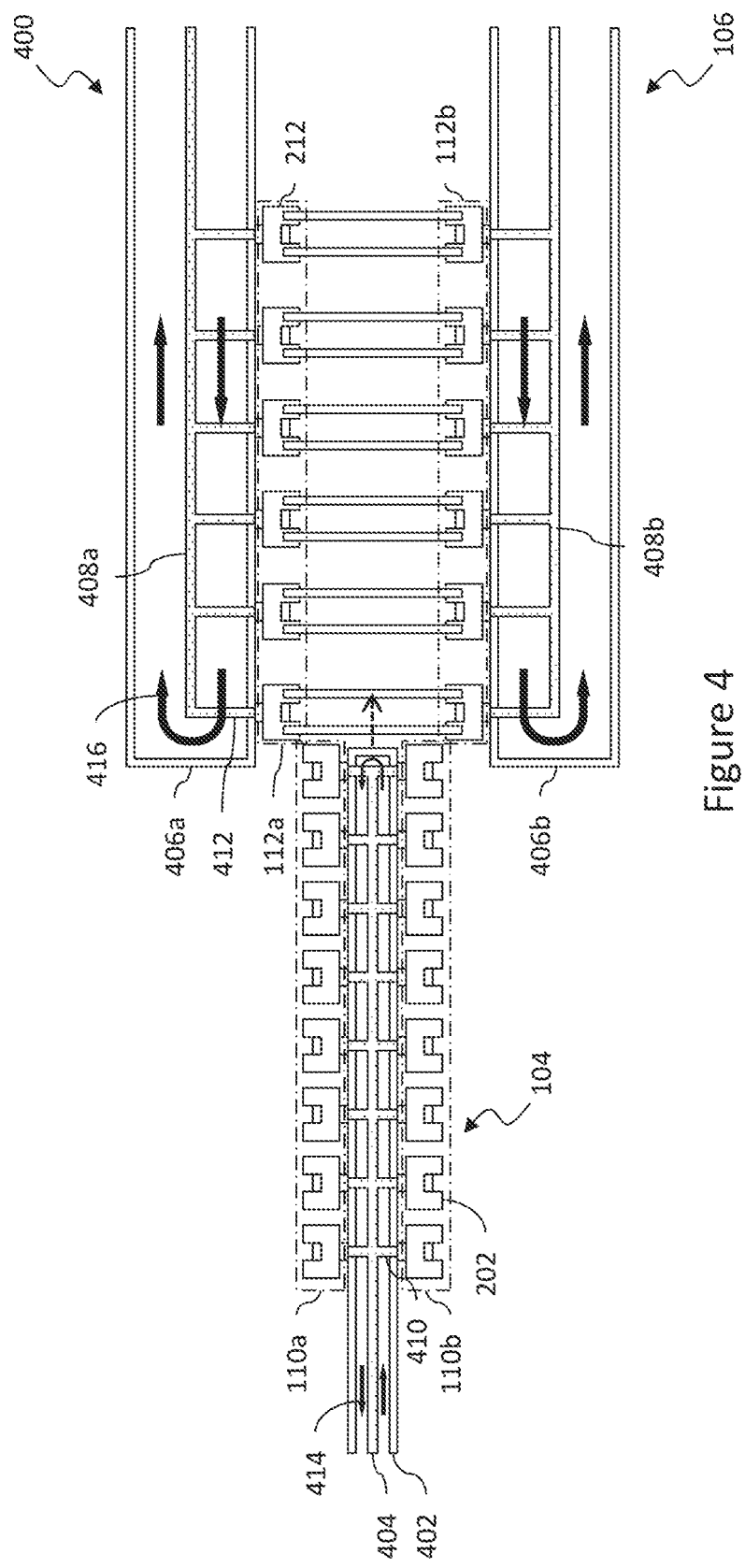
FIG. 4 illustrates a detailed schematic diagram of an actively cooled artificial muscle fiber, in accordance with an embodiment of the present disclosure.

FIG. 4 illustrates an actively cooled artificial muscle fiber 400, in accordance with some embodiments. The actively cooled artificial muscle fiber 400 may be similar to the actively cooled artificial muscle fiber 300, except that the actively cooled artificial muscle fiber 400 includes flexible tape wires 400, 408a, and 408b disposed inside of channels 402, 406a, and 406b, respectively. The actively cooled artificial muscle fiber 400 includes an internal fiber 104 having a first channel 402 mechanically coupled to a flexible tape wire 404 through struts 410. Actuators 202 in actuator arrays 110a and 110b are electrically and mechanically coupled to the flexible tape wire 404 through the struts 410 which extend through the first channel 402. The actively cooled artificial muscle fiber 400 further includes an external fiber 106 having second channels 406a and 406b mechanically coupled to flexible tape wires 408a and 408b, respectively, through struts 412. Actuators 212 in actuator arrays 112a and 112b are electrically and mechanically coupled to the flexible tape wires 408a and 408b through the struts 410 which extend through the second channels 406a and 406b.

The channels 402, 406a, and 406b may be used to provide cooling for the actuators 202 and 212 included in the internal fiber 104 and the external fiber 106, respectively. For example, heat generated in the actuators 202 and 212 during actuation of the actively cooled artificial muscle fiber 300 may be transferred through the flexible tape wires 404, 408a, and 408b to the channels 402, 406a, and 406b through conduction. A heat transfer fluid, such as water, air, or the like may flow through the channels 402, 406a, and 406b and may cool the flexible tape wires 404, 408a, and 408b through convection. Arrows 414 and 416 indicate the flow of the heat transfer fluid through the channels 402, 406a, and 406b. Although FIG. 4 illustrates a single channel 402 included in the internal fiber 104, multiple channels may be provided, such as two channels on opposite sides of the flexible tape wire 404. Providing two channels on opposite sides of the flexible tape wire 404 improves the uniformity of cooling across the actuators 202 of the actuator arrays 110a and 110b.

Figure 5A:
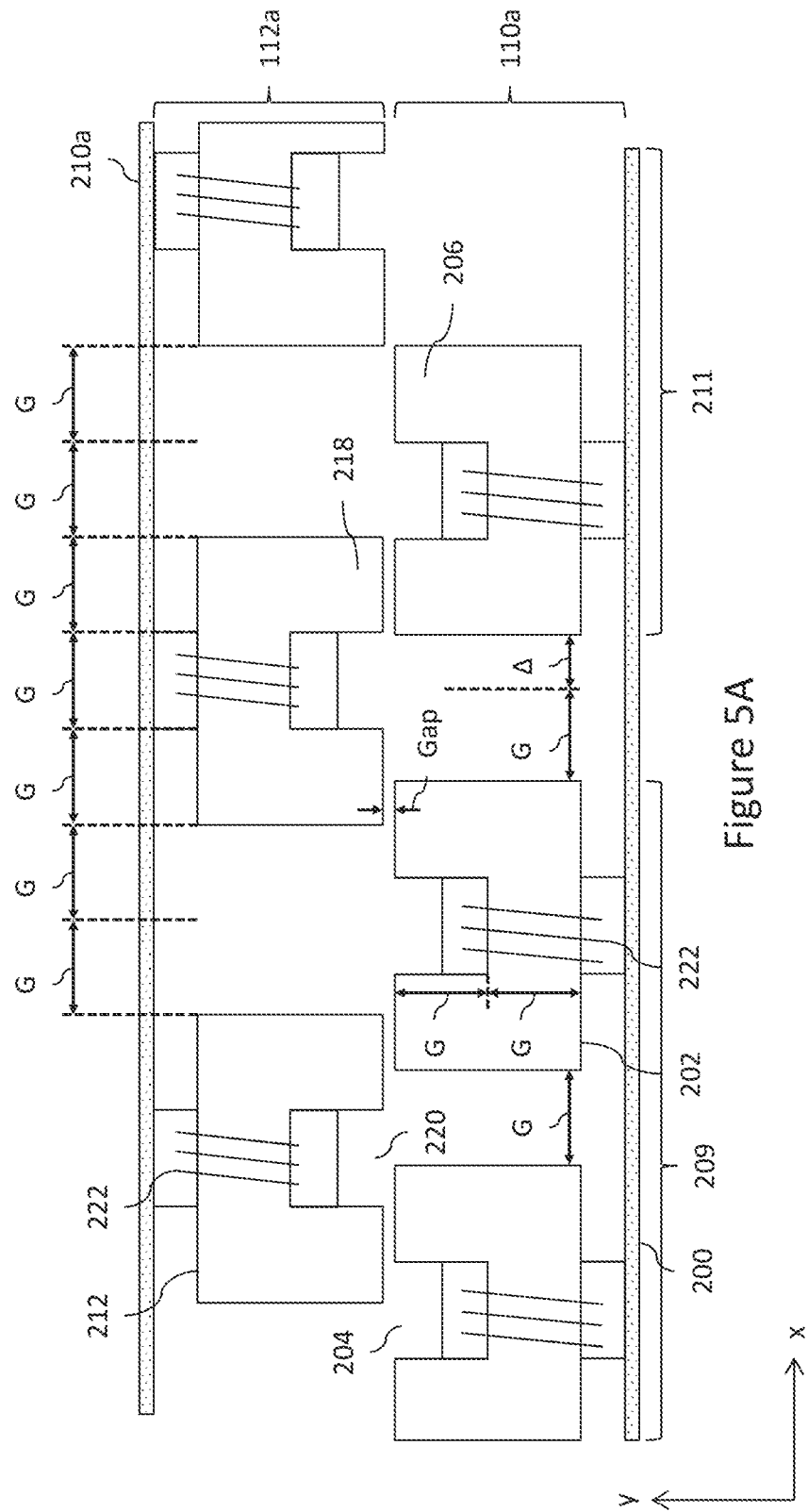
FIGS. 5A and 5B illustrate zoomed-in longitudinal views of some actuators of the artificial muscle fiber of FIGS. 2A to 2D, in accordance with various embodiments of the present disclosure.

FIG. 5A illustrates a zoomed-in longitudinal view of some of the actuators 202 and 212 of the internal fiber 104 and the external fiber 106. FIG. 5A highlights pertinent dimensions of the actuators 202 and 212 of the internal fiber 104 and the external fiber 106, and for the sake of simplicity and clarity, only some actuators 202 of the first array of actuators 110a of the internal fiber 104 and only some actuators 212 of the first array of actuators 112a of the external fiber 106 are shown. For the same reasons of simplicity and clarity, the rigid paramagnetic connectors 216 that bond opposing actuators of the external fiber 106 and any channels 302, 306a, 306b, 402, 406a, and 406b used to cool the internal fiber 104 and the external fiber 106 are omitted from FIG. 5A.

The non-zero gap that separates the protrusions 206 of the internal actuators 202 and the protrusions 218 of the external actuators 212 (indicated in FIG. 5A with the label "Gap") may be from 0 to G/10. As described above in reference to FIG. 2A, the actuator array 110a is divided into the first group 209 and the second group 211. As shown in FIG. 5A, within the first group 209, adjacent (e.g., immediately adjacent) actuators 202 are separated by the dimension G. However, as also shown in FIG. 5A, the first group 209 of actuators 202 is separated from the second group 211 of actuators 202 by a dimension (G+A).

The actuators 202 of the internal fiber 104 and the actuators 212 of the external fiber 106 may have identical dimensions, which may be related to the dimension G. In particular, as illustrated in FIG. 5A, the protrusions 206 and the protrusions 218 have widths along the longitudinal axis (e.g., the y-axis in FIG. 5A) that are equal to the dimension G. Additionally, the notches 204 and the notches 220 have widths along the longitudinal axis (e.g., the y-axis in FIG. 5A) that are equal to the dimension G. The protrusions 206 and the protrusions 218 extend from their respective notches 204 or notches 220 (e.g., in the y-direction in FIG. 5A) by the dimension G. The actuators 202 and the actuators 212 may have thicknesses (e.g., in a z-direction, not illustrated in FIG. 5A) from about G to about 20·G. In some embodiments, the dimension G may be from about 100 μm to about 2000 m.

While the dimensions of the actuators 202 of the internal fiber 104 and the actuators 212 of the external fiber 106 may be the same, it is noted that the pitches may be different. As an example, the pitch of the actuators 212 of the external fiber 106 is greater than the pitch of the actuators 202 of the internal fiber 104. As an illustration, in the example of FIG. 5A, the pitch of the actuators 212 of the external fiber 106 is 5 times the dimension G, while the pitch of the actuators 202 in each of the first group 209 and the second group 211 of the actuators of the internal fiber 104 is 4 times the dimension G. An extra separation Δ is added along the chains of actuators 202 of the internal fiber 104 after every pre-determined number of actuators 202 (e.g., after every four actuators 202). In some embodiments, the extra separation Δ may be equal to half the dimension G. It is noted that the stated pitches are exemplary and other pitches may be possible in other embodiments.

Figure 5B:
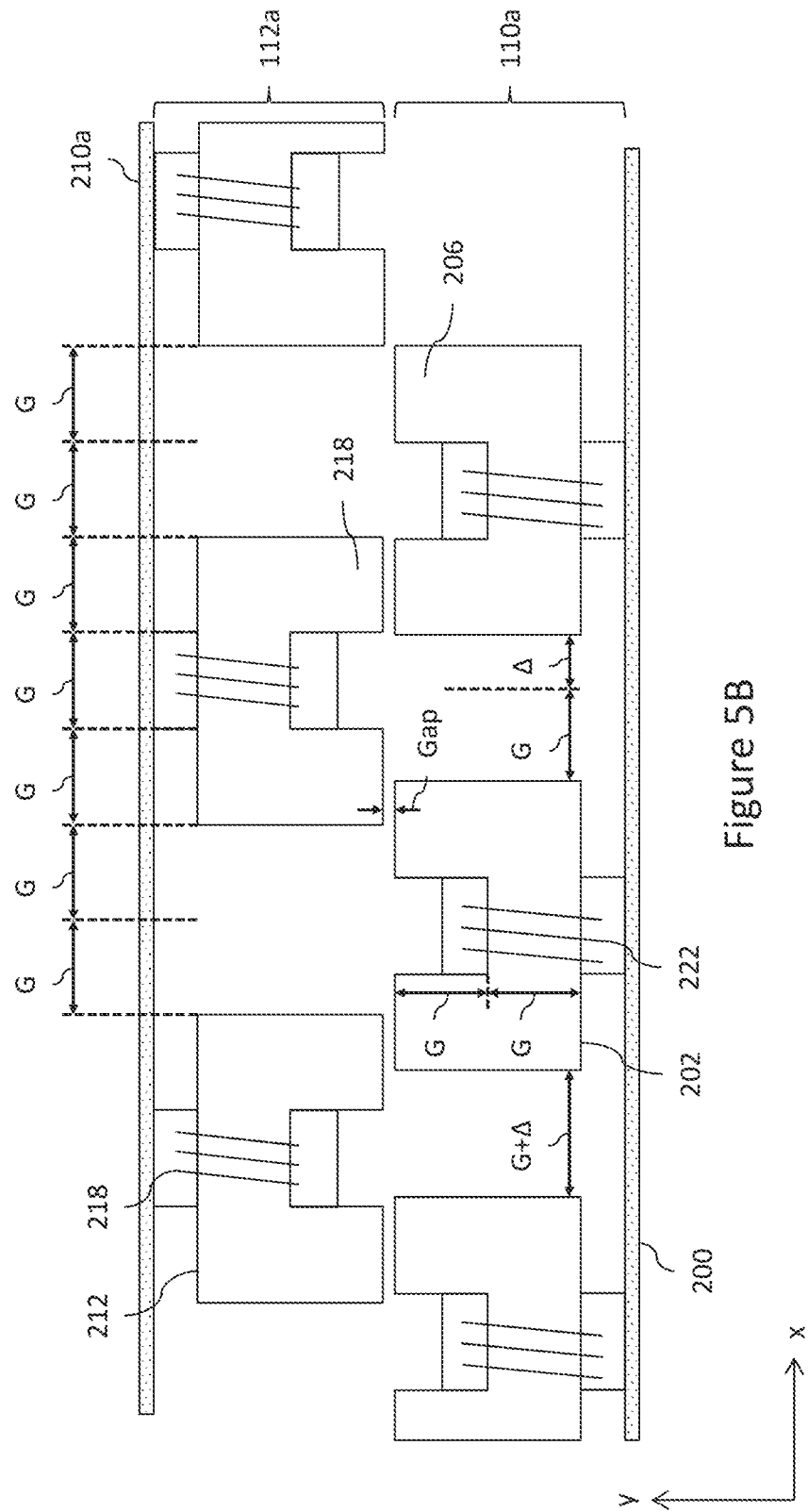

FIG. 5B shows a zoomed-in longitudinal view of some of the actuators 202 and 212 of the internal fiber 104 and the external fiber 106 in another embodiment. The difference between the embodiments of FIGS. 5A and 5B is that in the arrangement of FIG. 5B, the actuator array 110a is not divided into the first group 209 and the second group 211 and, instead, the pitch along the entire chain of actuators 202 of the internal fiber 104 is constant. In the example illustrated in FIG. 5A, the pitch of the actuators 212 of the external fiber 106 is 5 times the dimension G, while the pitch of the actuators 202 of the internal fiber 104 is 4.5 times the dimension G. However, as with the example of FIG. 5A, it is noted that the stated pitches are exemplary and other pitches may be possible in other embodiments.

FIGS. 6A to 6F illustrate the motion generated by a switching sequence applied to the actuators 202 and 212 of the internal fiber 104 and the external fiber 106 of FIG. 5B, in accordance with an embodiment of the present disclosure. Due to the symmetry of the artificial muscle fiber 100 along the central longitudinal axis 214 of the external fiber 106, only the switching sequence applied to the first array of actuators 110a of the internal fiber 104 and the first array of actuators 112a of the external fiber 106 are shown in FIGS. 6A to 6F. It is noted that an identical switching sequence is applied to the second array of actuators 110b of the internal fiber 104 and the second array of actuators 112b of the external fiber 106.

The switching sequence includes providing (e.g., simultaneously providing) an electrical current to one actuator 202 of the first array of actuators 110a of the internal fiber 104 and to one actuator 212 of the first array of actuators 112a of the external fiber 106 that are in a proper or predetermined relative position. In FIGS. 6A to 6F, the switched actuators are identified by the high, closed loop, magnetic field density. All the others actuators 202 and 212 are turned off during this step (e.g., due to no current being provided to the other actuators 202 and 212). The next step includes providing (e.g., simultaneously providing) an electrical current to an adjacent actuator 202 of the first array of actuators 110a of the internal fiber 104 and to an adjacent actuator 212 of the first array of actuators 112a of the external fiber 106 that are now in the proper relative position. As in the preceding step, all the others actuators 202 and 212 are turned off during this subsequent step. This sequence of steps continues with the sequential provision of an electrical current to an actuator 202 of the internal fiber 104 and to an actuator 112a of the external fiber 106 that are in the proper or predetermined relative position until the desired motion is achieved. It is once again noted that an identical switching sequence is applied to the second array of actuators 110b of the internal fiber 104 and the second array of actuators 112b of the external fiber 106, thereby achieving identical motion therein.

In FIGS. 6A to 6F, each step produces a shift of G/2 in the x direction. The actuator chain 110a of the internal fiber 104 is kept still in FIGS. 6A to 6F, although an orthogonal force $F_y$ is exerted on the actuator chain 110a of the internal fiber 104 as shown in FIGS. 6A to 6F. The internal fiber 104 is kept still in the longitudinal direction (e.g., along the x-axis) for the purposes of the simulation shown in FIGS. 6A to 6F. The actuator chain 112a of the exterior fiber 106 moves from right to left (as shown by the arrow and force $F_X$ exerted on the actuator chain 112a of the exterior fiber 106). The two opposing triangular markers 400 and 402 also show the motion of the actuator chain 112a of the exterior fiber 106 through the increase of the relative separation of the two opposing triangles markers 400 and 402.

FIGS. 7A to 7J illustrate a process of manufacturing an actuator of the artificial muscle fiber 100, in accordance with an embodiment. FIG. 7A shows a top-down view and a cross-sectional view of a semiconductor substrate 700 that acts as a sacrificial material in which the actuator is manufactured. The cross-sectional view is taken along the line B-B indicated in FIG. 7A. The semiconductor substrate 700 may be a silicon wafer.

FIG. 7B illustrates a mask layer 702 that is formed and patterned over the semiconductor substrate 700. The mask layer 702 is deposited on the semiconductor substrate 700 (e.g., using vapor deposition processes) and patterned using suitable photolithography techniques. In some embodiments, where the mask layer 702 includes a photoresist material, the photoresist material is irradiated (e.g., exposed to a patterned energy source) and developed to remove portions of the photoresist material in order to expose portions of the semiconductor substrate 700, as shown in FIG. 7B.

FIG. 7C shows a trench 704 formed in the semiconductor substrate 700 by an etching process. A top-down view of the trench 704 has the U-shape that is needed for the actuators 202 and 212 of the artificial muscle fiber 100. The mask layer 702 functions as an etch mask during the etching process, which may include isotropic wet etching processes, anisotropic dry etching processes, or combinations thereof.

FIG. 7D shows that the trench 704 may be filled with a soft magnetic material 706 through an electro chemical deposition (ECD) process, followed by a planarization such as a chemical mechanical polish (CMP) to ensure that the top-most surfaces of the soft magnetic material 706 and the semiconductor substrate 700 are substantially flush. The mask layer 702 may also be removed so as to expose portions of the semiconductor substrate 700 in which windings are formed in a subsequent step.

FIG. 7E shows the formation of high aspect ratio, high density through vias 708 that are filled with a conductive material (e.g., copper). This process may be performed by copper through silicon vias (TSV) technology known in the art. The vias 708 are formed in the semiconductor substrate 700 next to the vertical walls of the soft magnetic material 706. As shown in FIG. 7E, the vias 708 are also located between the protrusions of the actuator.

Through a sequence of conventional dielectric depositions and lithography steps, first on the front-side of the semiconductor substrate 700 and then on the backside of the semiconductor substrate 700, the vias can be connected to form a squared winding (e.g., the windings 208 and 222 illustrated in FIG. 8) around the soft magnetic material 706. This proposed sequence is shown in FIGS. 7F to 7J.

In FIG. 7F, vias 708 on opposite sides of the vertical walls of the soft magnetic material 706 are coupled to each other by interconnecting wires 710 that are formed from the same conductive material (e.g., copper) that fills the vias 708. This may be accomplished by a one or more insulation and lithography processes performed on the exposed surface of the semiconductor substrate 700 that deposit conductive material in the manner shown in FIG. 7F to form the interconnecting wires 710.

FIG. 7G shows that the front-side of the semiconductor substrate 700 having the interconnecting wires 710 is attached to a carrier substrate 712 via a die attach film (DAF) 714 that acts to adhere the semiconductor substrate 700 to the carrier substrate 712. As a result of the step shown in FIG. 7G, the backside of the semiconductor substrate 700 is exposed and may be subjected to further processing in order to form a squared winding around the soft magnetic material 706.

In particular, in FIG. 7H, the backside of the semiconductor substrate 700 and the vias 708 are planarized to expose the backside of the soft magnetic material 706 so that the backside of the semiconductor substrate 700, the backside of the soft magnetic material 706 and the exposed ends of the vias 708 are substantially flush. Subsequently, as shown in FIG. 7I, further interconnecting wires 716 are formed (e.g., using the same processes described above with respect to FIG. 7F) to complete the squared winding around the soft magnetic material 706. FIG. 7J shows that an etching process (e.g., a selective wet chemical etching) is applied to remove the remaining portions of the sacrificial semiconductor substrate 700, thereby forming the freestanding actuator.

The proposed method results in a single actuator, and consequently, an IC assembly technology may be needed for the successive steps of wire bonding the manufactured actuators onto proper connecting strips. Materials for such a strip can be chosen for process convenience and electronics integration. Many materials may be able to sustain the developed force even as thin film.

Figure 8:
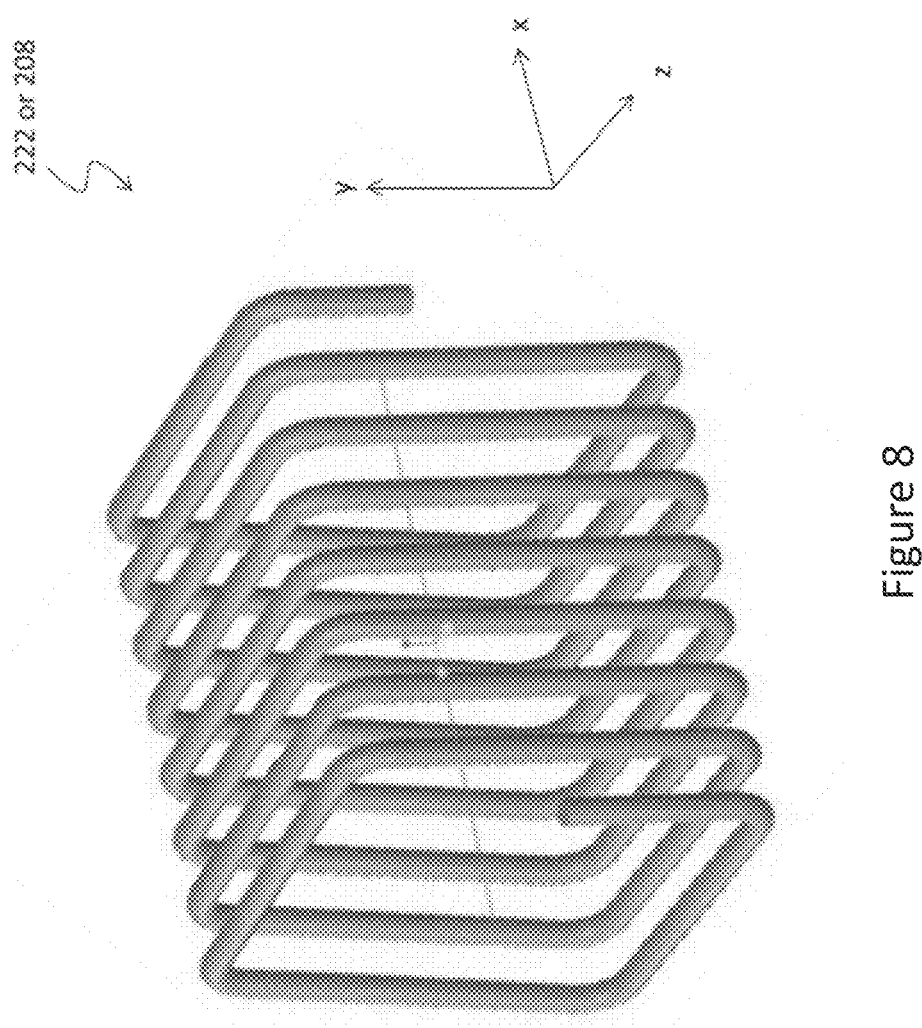
FIG. 8 illustrates a squared winding that may be formed around a portion of an actuator of an artificial muscle fiber, in accordance with an embodiment of the present disclosure.

FIG. 8 illustrates either of the windings 208 or 222. As illustrated in FIG. 8, the windings 208 and 222 may be generally square-shaped. However, other shapes are also possible, such as a generally rounded shape or the like.

Figure 9:
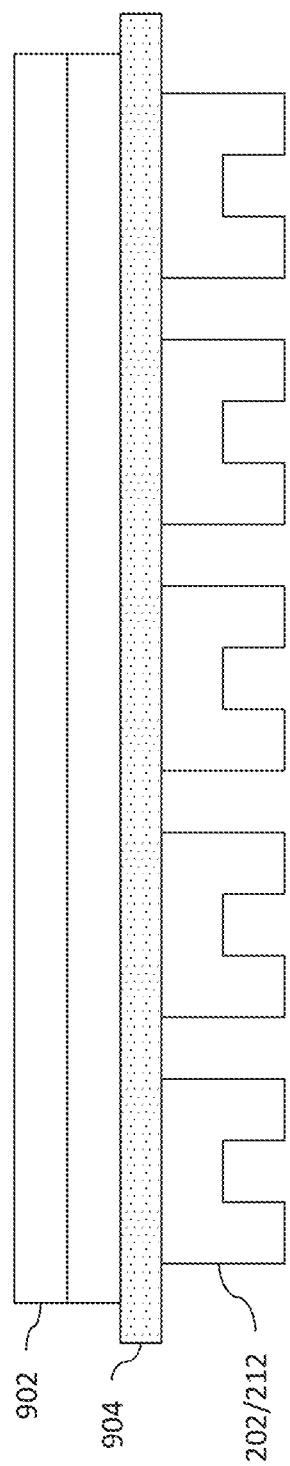
FIG. 9 illustrates a method of manufacturing a portion of an artificial muscle fiber including a channel, in accordance with an embodiment of the present disclosure.

FIGS. 9 to 11Kiii processes of manufacturing the channels 302, 306a, 306b, 402, 406a, and 406b illustrated in FIGS. 3 and 4, in accordance with various embodiments. FIG. 9 illustrates a side-view of a channel 902 and actuators 202 or 212 attached to a flexible tape wire 904. The channel 902 may be the same as or similar to any of the channels 302, 306a, 306b, 402, 406a, or 406b discussed above and the flexible tape wire 904 may be the same as or similar to any of the flexible wires 304a, 304b, 308a, 308b, 404, 408a, or 408b discussed above. In the embodiment illustrated in FIG. 9, the channel 902 may be preformed and attached to the flexible tape wire 904 through welding or the like. In some embodiments, the channel 902 may be 3D printed over the flexible tape wire 904.

Figures 10A, 10B:
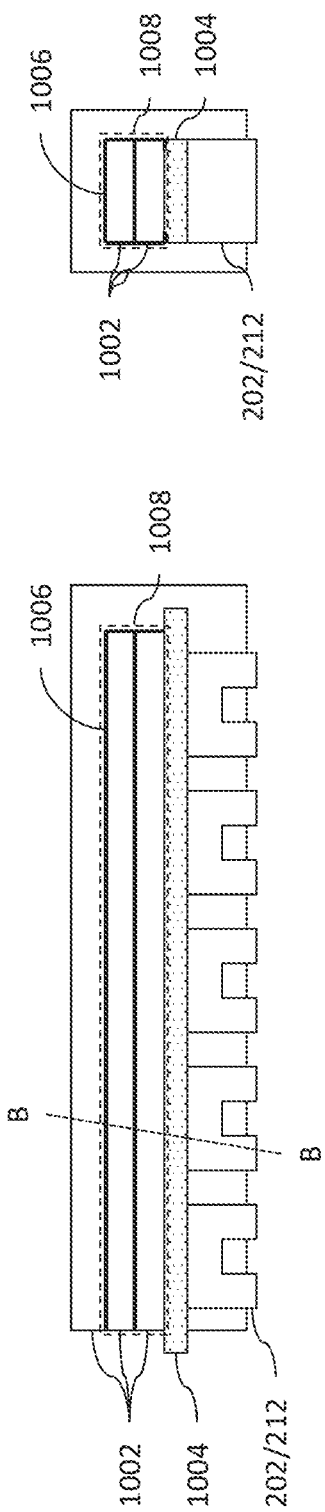
FIGS. 10A and 10B illustrate a method of manufacturing a portion of an artificial muscle fiber including a channel, in accordance with an embodiment of the present disclosure.

FIGS. 10A and 10B illustrate cross-sectional views of an injection molding process which may be used to form a channel 1008. The cross-sectional view illustrated in FIG. 10B is taken along the line B-B indicated in FIG. 10A. As illustrated in FIGS. 10A and 10B, a mold 1002 is placed over a flexible tape wire 1004 to which actuators 202 and 212 are attached. The mold 1002 includes a mold cavity 1006. A material for the channel 1008 is injected into the mold cavity 1006. For example, the channel 1008 may be formed of a polymer and the polymer may be melted and injected into the mold cavity 1006. The mold 1002 may then be removed leaving the channel 1008 over the flexible tape wire 1004.

Figure 11A:
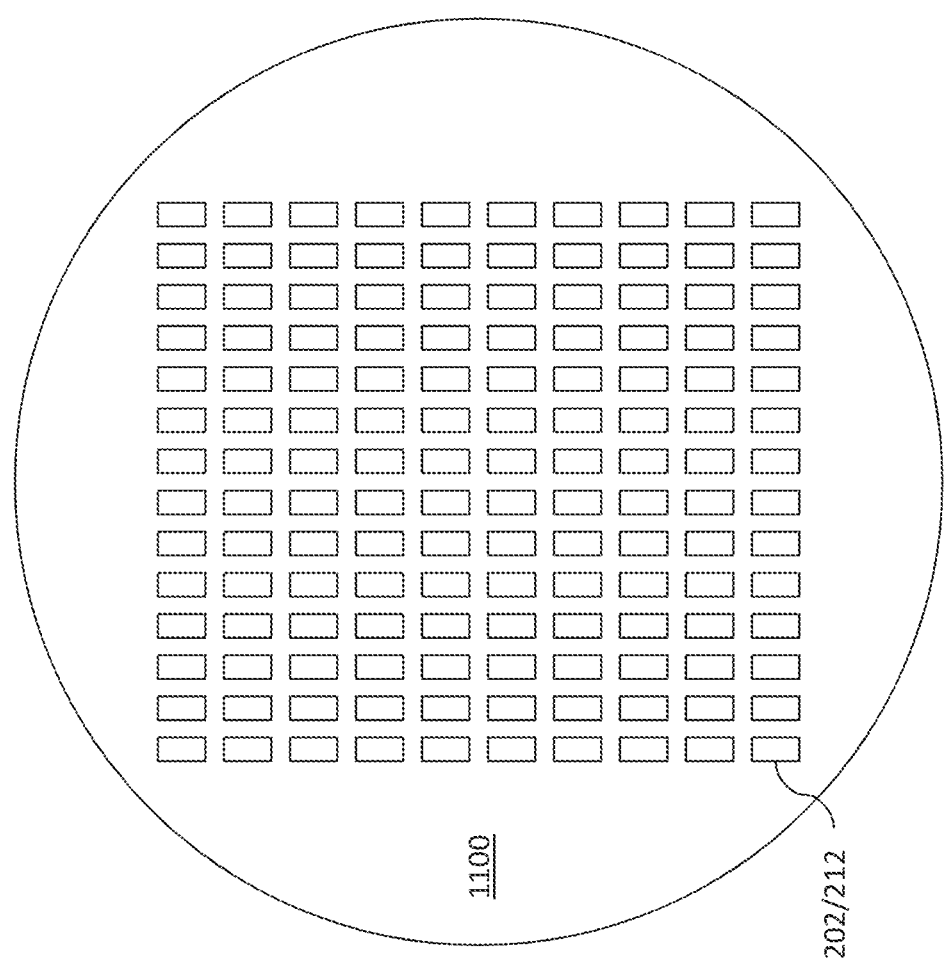

FIGS. 11A-11Kiii illustrate a process for forming channels 1120 (illustrated in FIGS. 11Ji-11Kiii) using a wafer-level process. In FIGS. 11Bi-11Jiii, figures ending with an "i" designation are illustrated in a top-down view; figures ending with an "ii" designation are illustrated along reference cross-section B-B illustrated in FIG. 11Bi, and figures ending with an "iii" designation are illustrated along reference cross-section C-C illustrated in Figure Bii. FIGS. 11Ki-11Kiii are cross-sectional views with FIG. 11Kii being illustrated along the line B-B indicated in FIG. 11Ki and FIG. 11Kiii being illustrated along the line C-C indicated in FIG. 11Ki. In FIG. 11A, a plurality of actuators 202/212 are formed on a wafer 1100. The wafer 1100 may be a silicon wafer, although any wafer known in the art may be used. The actuators 202/212 may be U-shaped, as discussed above, and protrusions of the actuators 202/212 may face downward toward the wafer 1100.

In FIGS. 11Bi-11Biii, flexible tape wires 1102 are attached to the actuators 202/212. The flexible tape wires 1102 may be the same as or similar to any of the flexible wires 304a, 304b, 308a, 308b, 404, 408a, or 408b discussed above. In some embodiments, the flexible wires 1102 may be formed on a second wafer and transferred to the wafer 1100.

In FIGS. 11Ci-11Ciii, a first polymer layer 1104 is deposited over the wafer 1100 and the flexible tape wires 1102. The first polymer layer 1104 may comprise a permanent photoresist material (e.g., a polyimide-based resist, an epoxy-based photoresist such as SU-8, or the like), a non-photosensitive polymer (e.g., a silicon-based polymer, a polyimide, or the like), or the like. The first polymer layer 1104 may be deposited using spin-coating, lamination, or the like. In FIGS. 11Di-11Diii, the first polymer layer 1104 may be etched to define first channel walls 1106. The first polymer layer 1104 may be etched by depositing a photoresist (not separately illustrated) over the first polymer layer 1104, exposing and developing the photoresist, and anisotropically etching the first polymer layer 1104 using the photoresist as a mask. The first polymer layer 1104 may be anisotropically etched using a process such as a reactive ion etch (RIE), a neutral beam etch (NBE), or the like.

In FIGS. 11Ei-11Eiii, a second polymer layer 1108 is deposited over the wafer 1100 and the first channel walls 1106. The second polymer layer 1108 may be formed of the same materials or similar materials to the materials of the first polymer layer 1104. The second polymer layer 1108 may be deposited using lamination or the like. In FIGS. 11Fi-11Fiii, the second polymer layer 1108 may be etched to define first baffles 10. The second polymer layer 1108 may be etched by depositing a photoresist (not separately illustrated) over the second polymer layer 1108, exposing and developing the photoresist, and anisotropically etching the second polymer layer 1108 using the photoresist as a mask. The second polymer layer 1108 may be anisotropically etched using a process such as a reactive ion etch (RIE), a neutral beam etch (NBE), or the like.

In FIGS. 11Gi-11Giii, a third polymer layer 1112 is deposited over the wafer 1100 and the first baffles 1110. The third polymer layer 1112 may be formed of the same materials or similar materials to the materials of the first polymer layer 1104. The third polymer layer 1112 may be deposited using spin-coating, lamination, or the like. In FIGS. 11Hi-11Hiii, the third polymer layer 1112 may be etched to define second channel walls 1114. The third polymer layer 1112 may be etched by depositing a photoresist (not separately illustrated) over the third polymer layer 1112, exposing and developing the photoresist, and anisotropically etching the third polymer layer 1112 using the photoresist as a mask. The third polymer layer 1112 may be anisotropically etched using a process such as a reactive ion etch (RIE), a neutral beam etch (NBE), or the like.

In FIGS. 11Ii-11Iiii, a fourth polymer layer 1116 is deposited over the wafer 1100 and the second channel walls 1114. The fourth polymer layer 1116 may be formed of the same materials or similar materials to the materials of the first polymer layer 1104. The fourth polymer layer 1116 may be deposited using lamination or the like. In FIGS. 1Ji-11Jiii, the fourth polymer layer 1116 may be etched to define third channel walls 1118. The fourth polymer layer 1116 may be etched by depositing a photoresist (not separately illustrated) over the fourth polymer layer 1116, exposing and developing the photoresist, and anisotropically etching the fourth polymer layer 1116 using the photoresist as a mask. The fourth polymer layer 1116 may be anisotropically etched using a process such as a reactive ion etch (RIE), a neutral beam etch (NBE), or the like. The first channel walls 1106, the first baffles 1110, the second channel walls 1114, and the third channel walls 1118 collectively form the channels 1120. Following the process illustrated in FIGS. 1Ji-11Jiii, the wafer 1100 may be diced or otherwise removed from the actuators 202/212 to form half-fibers including the actuators 202/212, the flexible tape wires 1102, and the channels 1120.

In FIGS. 11Ki-11Kiii, an internal fiber 104 and an external fiber 106 are formed by bonding connectors 1122a and 1122b (e.g., non-ferromagnetic connectors) to actuators 202 and 212, respectively. The internal fiber 104 may include actuator arrays 110a and 110b and the external fiber 106 may include actuator arrays 112a and 112b. Although FIGS. 11Ki and 11Kii illustrate a single channel 1120 formed between the actuator arrays 110a and 110b of the internal fiber 104, any number of channels 1120, such as two channels 1120, may be disposed between the actuator arrays 110a and 110b of the internal fiber 104. The actuator arrays 110a and 110b may include the same number of actuators 202 arranged symmetrically about a central longitudinal axis of the internal fiber 104 and the actuator arrays 112a and 112b may also include the same number of actuators 212 arranged symmetrically about a central longitudinal axis of the external fiber 106. The connectors 1122a may be bonded to any combination of the actuators 202, the flexible tape wires 1102, and the channel 1120 and the connectors 1122b may be bonded to any combination of the actuators 212, the flexible tape wires 1102, and the channels 1120. The connectors 1122a and 1122b may be bonded using welding, gluing, or the like.

Figure 12:
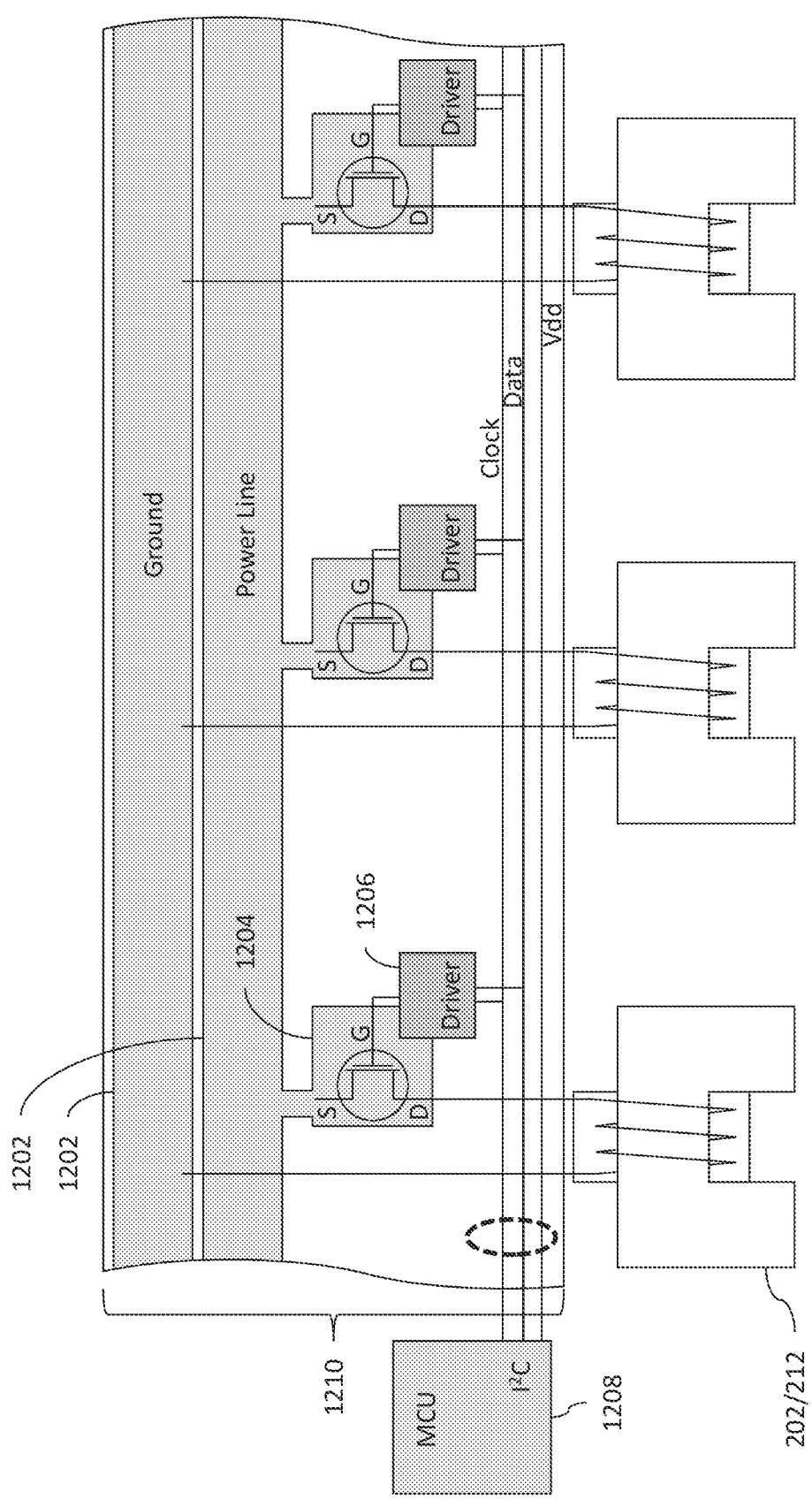
FIG. 12 illustrates a sketch of a circuit distribution along a flexible tape wire, in accordance with an embodiment of the present disclosure.

The stepped motion sequence, as described above in reference to FIGS. 6A to 6F, requires the actuators 202, 212 of the various array segments 110a, 110b, 112a, 112b to be independently powered and driven through application specific integrated circuits (ASICs) and/or microcontrollers. FIG. 12 shows a sketch of a possible circuit distribution along flexible tape wires 1210. The flexible tape wires 1210 may be the same as or similar to any of the flexible tape wires 200, 210a, 210b, 304a, 304b, 308a, 308b, 404, 408a, 408b, 904, 1004, or 1102, discussed above. Due to the flexibility required of the artificial muscle fiber 100, power devices are placed over the rigid actuators, whole analog and digital busses are placed in the space between two adjacent actuators.

As illustrated in FIG. 12, the flexible tape wire includes a plurality (e.g., two) power bus lines 1202 (e.g., a power line and a reference potential line, such as a ground line), a plurality of distributed power transistors 1204 (e.g., MOSFETS), and respective drivers 1206 associated with the distributed power transistors 1204. The power and ground lines 1202 connect to the distributed power transistors 1204 and actuator windings. A microcontroller 1208, which may be placed at the end of the flexible tape wires 1210, exchanges data via an I²C bus 1210, with the drivers 1206 to independently drive the distributed power transistors 1204. It is noted that one design aspect pertains to the dimensions of the distributed power transistors 1204. Such devices may need to be small enough to allow the electronics to be distributed all along the fiber but not too small to avoid high on-resistance and therefore high power consumption and heat generation. The resistance may be about 2 mΩ·mm², and with such resistance, the distributed power transistors 1204 can be properly scaled to fit the actuator dimensions. For example, applying to the above simulated fiber, a distributed power transistor 1204 may be about 0.5 mm² (e.g., die size) and have a power consumption of about 1 mW, about hundred times less than the power consumption of the actuators 202 and 212.

This disclosure presents an actuator, based on the linear synchronous motor principle, whose structure dimension and manufacturing could allow the direct application as artificial muscle fiber. This disclosure further presents various methods and structures for cooling an artificial muscle fiber, resulting in improved performance and a reduction in defects in the artificial muscle fiber. Both the passively cooled artificial muscle fiber and the actively cooled muscle fiber may have decreased density compared with other muscle fibers, with the actively cooled muscle fiber having a density very close to that of a natural muscle fiber. Developed pressure and stress-strength behavior are comparable with natural muscle fibers. The design implies intrinsic actuator compliance, since no gears, bearings, or other possible blocking parts are involved. Flexibility in the proposed artificial muscle fiber allows the construction of muscle bundles to obtain bio-inspired robot structure. Other device parameters, like low voltage, flexibility, scalability, etc., could allow a direct implementation in wearable robotics. The proposed design is simple, flat, includes distributed electronics, thereby allowing use of IC technology as a method of manufacture, involving both assembly processes and planar technology. The proposed design also exhibits high compliance, high pressure, low voltage, flexibility, scalability, and silent operation.

In accordance with an embodiment, an artificial muscle fiber includes an external fiber including a first linear array of actuators attached to a first flexible tape wire, the first linear array of actuators having protrusions directed in a first direction; a first cooling channel attached to the first flexible tape wire opposite the first linear array of actuators; and an internal fiber including a second linear array of actuators attached to a second flexible tape wire, the second linear array of actuators having protrusions directed in a second direction opposite to the first direction. In an embodiment, the artificial muscle fiber further includes a second cooling channel attached to the second flexible tape wire opposite the second linear array of actuators. In an embodiment, the first flexible tape wire forms a wall of the first cooling channel. In an embodiment, the first flexible tape wire includes struts attached to the actuators of the first linear array of actuators, the struts extending through a wall of the first cooling channel disposed between the first flexible tape wire and the first linear array of actuators. In an embodiment, the artificial muscle fiber further includes a second external fiber including a third linear array of actuators, wherein each of the actuators of the first linear array of actuators are connected to one of the actuators of the third linear array of actuators using a plurality of connectors. In an embodiment, the connectors are non-ferromagnetic. In an embodiment, the first flexible tape wire and the second flexible tape wire include integrated power and logic electronics for controlling switching of the first linear array of actuators and the second linear array of actuators.

In accordance with another embodiment, an artificial muscle fiber includes an internal fiber, including a first flexible tape; a first array of actuators protruding in a first direction from a major surface of the first flexible tape; a second flexible tape; a second array of actuators protruding in a second direction from a major surface of the second flexible tape, the first direction being opposite to the second direction; and a first channel disposed between the first flexible tape and the second flexible tape; and an external fiber, including an opening within which a portion of the internal fiber is positioned; a third flexible tape defining a first sidewall of the opening; a fourth flexible tape defining a second sidewall of the opening; a third array of actuators protruding in the second direction from a major surface of the third flexible tape towards the first array of actuators; and a fourth array of actuators protruding in the first direction from a major surface of the fourth flexible tape towards the second array of actuators. In an embodiment, the internal fiber further includes a second channel disposed between the first flexible tape and the second flexible tape, a first chamber of the first channel being isolated from a second chamber of the second channel. In an embodiment, an inlet of the first channel is proximal the first flexible tape, an outlet of the first channel is distal the first flexible tape, an inlet of the second channel is proximal the second flexible tape, and an outlet of the second channel is distal the second flexible tape. In an embodiment, the artificial muscle fiber further includes a third channel attached to the third flexible tape opposite the third array of actuators and a fourth channel attached to the fourth flexible tape opposite the fourth array of actuators. In an embodiment, the artificial muscle fiber further includes a third channel surrounding the third flexible tape and a fourth channel surrounding the fourth flexible tape portions of the third flexible tape extending through the third channel to the third array of actuators, and portions of the fourth flexible tape extending through the fourth channel to the fourth array of actuators. In an embodiment, the first channel is welded to the first flexible tape. In an embodiment, the first array of actuators is bonded to the second array of actuators by a first plurality of connectors comprising a non-ferromagnetic material. In an embodiment, the third array of actuators is bonded to the fourth array of actuators by a second plurality of connectors comprising a non-ferromagnetic material.

In accordance with yet another embodiment, a method of manufacturing an artificial muscle fiber includes forming a plurality of actuators on a semiconductor substrate; attaching an electronics ribbon to the plurality of actuators; depositing a first polymer over the electronics ribbon; patterning the first polymer to form first channel walls; depositing a second polymer over the first channel walls; patterning the second polymer to form second channel walls, the first channel walls and the second channel walls forming a channel over the electronics ribbon; and dicing the semiconductor substrate to form a half fiber including the plurality of actuators, the electronics ribbon, and the channel. In an embodiment, the first polymer is deposited using spin coating or lamination. In an embodiment, the electronics ribbon is transferred to the plurality of actuators from a second semiconductor substrate. In an embodiment, the method further includes bonding the half fiber to a second half fiber including a second plurality of actuators, a second electronics ribbon, and a second channel, bonding the half fiber to the second half fiber including welding or gluing a plurality of non-ferromagnetic connectors to the plurality of actuators and the second plurality of actuators. In an embodiment, the half fiber is bonded to the second half fiber such that the channel and the second channel are disposed between the electronic ribbon and the second electronic ribbon.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An artificial muscle fiber, comprising:
   an external fiber comprising a first linear array of actuators attached to a first flexible tape wire, the first linear array of actuators having protrusions directed in a first direction;
   a first cooling channel attached to the first flexible tape wire opposite the first linear array of actuators; and
   an internal fiber comprising a second linear array of actuators attached to a second flexible tape wire, the second linear array of actuators having protrusions directed in a second direction opposite to the first direction.

2. The artificial muscle fiber of claim 1, further comprising a second cooling channel attached to the second flexible tape wire opposite the second linear array of actuators.

3. The artificial muscle fiber of claim 1, wherein the first flexible tape wire forms a wall of the first cooling channel.

4. The artificial muscle fiber of claim 1, wherein the first flexible tape wire comprises struts attached to the actuators of the first linear array of actuators, the struts extending through a wall of the first cooling channel disposed between the first flexible tape wire and the first linear array of actuators.

5. The artificial muscle fiber of claim 1, further comprising a second external fiber comprising a third linear array of actuators, wherein each of the actuators of the first linear array of actuators are connected to one of the actuators of the third linear array of actuators using a plurality of connectors.

6. The artificial fiber of claim 5, wherein the connectors are non-ferromagnetic.

7. The artificial muscle fiber of claim 1, wherein the first flexible tape wire and the second flexible tape wire comprise integrated power and logic electronics for controlling switching of the first linear array of actuators and the second linear array of actuators.

8. An artificial muscle fiber, comprising:
   an internal fiber, comprising:
     a first flexible tape;
     a first array of actuators protruding in a first direction from a major surface of the first flexible tape;
     a second flexible tape;
     a second array of actuators protruding in a second direction from a major surface of the second flexible tape, wherein the first direction is opposite to the second direction; and
     a first channel disposed between the first flexible tape and the second flexible tape; and
   an external fiber, comprising:
     an opening within which a portion of the internal fiber is positioned;
     a third flexible tape defining a first sidewall of the opening;
     a fourth flexible tape defining a second sidewall of the opening;
     a third array of actuators protruding in the second direction from a major surface of the third flexible tape towards the first array of actuators; and
     a fourth array of actuators protruding in the first direction from a major surface of the fourth flexible tape towards the second array of actuators.

9. The artificial fiber of claim 8, wherein the internal fiber further comprises a second channel disposed between the first flexible tape and the second flexible tape, wherein a first chamber of the first channel is isolated from a second chamber of the second channel.

10. The artificial fiber of claim 9, wherein an inlet of the first channel is proximal the first flexible tape, wherein an outlet of the first channel is distal the first flexible tape, wherein an inlet of the second channel is proximal the second flexible tape, and wherein an outlet of the second channel is distal the second flexible tape.

11. The artificial fiber of claim 8, further comprising a third channel attached to the third flexible tape opposite the third array of actuators and a fourth channel attached to the fourth flexible tape opposite the fourth array of actuators.

12. The artificial fiber of claim 8, further comprising a third channel surrounding the third flexible tape and a fourth channel surrounding the fourth flexible tape portions of the third flexible tape extending through the third channel to the third array of actuators, and portions of the fourth flexible tape extending through the fourth channel to the fourth array of actuators.

13. The artificial fiber of claim 8, wherein the first channel is welded to the first flexible tape.

14. The artificial fiber of claim 8, wherein the first array of actuators is bonded to the second array of actuators by a first plurality of connectors comprising a non-ferromagnetic material.

15. The artificial fiber of claim 8, wherein the third array of actuators is bonded to the fourth array of actuators by a second plurality of connectors comprising a non-ferromagnetic material.

16. A method of manufacturing an artificial muscle fiber, the method comprising:
   forming a plurality of actuators on a semiconductor substrate;
   attaching an electronics ribbon to the plurality of actuators;
   depositing a first polymer over the electronics ribbon;
   patterning the first polymer to form first channel walls;
   depositing a second polymer over the first channel walls;
   patterning the second polymer to form second channel walls, the first channel walls and the second channel walls forming a channel over the electronics ribbon; and
   dicing the semiconductor substrate to form a half fiber including the plurality of actuators, the electronics ribbon, and the channel.

17. The method of claim 16, wherein the first polymer is deposited using spin coating or lamination.

18. The method of claim 16, wherein the electronics ribbon is transferred to the plurality of actuators from a second semiconductor substrate.

19. The method of claim 16, further comprising bonding the half fiber to a second half fiber comprising a second plurality of actuators, a second electronics ribbon, and a second channel, wherein bonding the half fiber to the second half fiber comprises welding or gluing a plurality of non-ferromagnetic connectors to the plurality of actuators and the second plurality of actuators.

20. The method of claim 19, wherein the half fiber is bonded to the second half fiber such that the channel and the second channel are disposed between the electronic ribbon and the second electronic ribbon.

* * * * *